US011850566B2

(12) United States Patent
Dahlgren et al.

(10) Patent No.: US 11,850,566 B2
(45) Date of Patent: Dec. 26, 2023

(54) SYNTHETIC FUEL PRODUCTION SYSTEM AND RELATED TECHNIQUES

(71) Applicant: Aircela Inc., New York, NY (US)

(72) Inventors: Eric Dahlgren, New York, NY (US); Klaus S. Lackner, Paradise Valley, AZ (US)

(73) Assignee: AIRCELA INC., New York, NY (US)

( * ) Notice: Subject to any disclaimer, the term of this patent is extended or adjusted under 35 U.S.C. 154(b) by 48 days.

(21) Appl. No.: 17/535,263

(22) Filed: Nov. 24, 2021

(65) Prior Publication Data

US 2022/0161222 A1  May 26, 2022

Related U.S. Application Data

(60) Provisional application No. 63/117,611, filed on Nov. 24, 2020.

(51) Int. Cl.
*B01J 19/24* (2006.01)
*C10G 3/00* (2006.01)
(Continued)

(52) U.S. Cl.
CPC ............ *B01J 19/245* (2013.01); *B01D 53/62* (2013.01); *B01D 53/78* (2013.01); *B01D 53/965* (2013.01);
(Continued)

(58) Field of Classification Search
CPC . B01J 19/245; B01J 2219/0004; B01D 53/62; B01D 53/78; B01D 53/965;
(Continued)

(56) References Cited

U.S. PATENT DOCUMENTS 4,030,430 A   7/1977   Dwyer et al.
4,592,817 A   6/1986   Chlanda et al.
(Continued)

FOREIGN PATENT DOCUMENTS

GB          2461723 A      1/2010
NO      2020245231 A2     12/2020
(Continued)

OTHER PUBLICATIONS

Steinberg & Dang, "Production of synthetic methanol from air and water using controlled thermonuclear reactor power—I. technology and energy requirement", ScienceDirect, Elsevier, Energy Conversion, vol. 17, Issues 2-3, 1977, pp. 97-112, 16 pages.
(Continued)

*Primary Examiner* — Ellen M McAvoy
(74) *Attorney, Agent, or Firm* — Hayes Soloway PC

(57) ABSTRACT

A synthetic fuel production system and related techniques are disclosed. In accordance with some embodiments, the disclosed system may be configured to produce a liquid fuel using carbon dioxide extracted from the air and hydrogen generated from aqueous solutions by electrochemical means (e.g., water electrolysis). In production of the fuel, the disclosed system may be configured, in accordance with some embodiments, to react the carbon dioxide and hydrogen, for example, to form methanol. The disclosed system also may be configured, in accordance with some embodiments, to utilize one or more subsequent reaction steps to produce a given targeted set of hydrocarbons and partially oxidized hydrocarbons. For example, the disclosed system may be used to produce any one (or combination) of: ethanol; dimethyl ether; formic acid; formaldehyde; alkanes of various chain length; olefines; aliphatic and aromatic carbon compounds; and mixtures thereof, such as gasoline fuels, diesel fuels, and jet fuels.

24 Claims, 8 Drawing Sheets

(51) Int. Cl.

| | |
|---|---|
| *C10L 1/06* | (2006.01) |
| *C10L 1/08* | (2006.01) |
| *B01D 53/62* | (2006.01) |
| *B01D 53/78* | (2006.01) |
| *C25B 1/04* | (2021.01) |
| *B01D 53/96* | (2006.01) |
| *C25B 15/08* | (2006.01) |

(52) U.S. Cl.
CPC .............. *C10G 3/00* (2013.01); *C10L 1/06* (2013.01); *C10L 1/08* (2013.01); *C25B 1/04* (2013.01); *C25B 15/081* (2021.01); *C25B 15/087* (2021.01); *B01D 2257/504* (2013.01); *B01J 2219/0004* (2013.01); *C10G 2400/02* (2013.01); *C10G 2400/04* (2013.01); *C10G 2400/08* (2013.01); *C10L 2200/043* (2013.01); *C10L 2200/0423* (2013.01); *C10L 2200/0446* (2013.01)

(58) Field of Classification Search
CPC .......... B01D 2257/504; B01D 2256/22; B01D 2259/4508; C10G 3/00; C10G 2400/02; C10G 2400/04; C10G 2400/08; C10L 1/06; C10L 1/08; C10L 2200/0423; C10L 2200/043; C10L 2200/0446; C25B 1/04; C25B 15/081; C25B 15/087
See application file for complete search history.

(56) References Cited

U.S. PATENT DOCUMENTS

| | | | |
|---|---|---|---|
| 6,685,821 B2 | 2/2004 | Kosek et al. | |
| 7,153,344 B2 | 12/2006 | Filippi et al. | |
| 7,326,280 B2 | 2/2008 | Hrycak et al. | |
| 7,326,329 B2 | 2/2008 | Gomez | |
| 7,635,531 B1 | 12/2009 | Carreiro et al. | |
| 7,655,069 B2 | 2/2010 | Wright et al. | |
| 7,674,358 B2 | 3/2010 | Gibson et al. | |
| 7,708,806 B2 | 5/2010 | Wright et al. | |
| 7,795,175 B2 | 9/2010 | Olah et al. | |
| 7,892,407 B2 | 2/2011 | Gibson et al. | |
| 7,947,120 B2 | 5/2011 | Deckman et al. | |
| 7,993,432 B2 | 8/2011 | Wright et al. | |
| 8,083,836 B2 | 12/2011 | Wright et al. | |
| 8,088,197 B2 | 1/2012 | Wright et al. | |
| 8,163,066 B2 | 4/2012 | Eisenberger | |
| 8,227,127 B2 | 7/2012 | Little et al. | |
| 8,246,723 B2 | 8/2012 | Wright et al. | |
| 8,257,474 B2 | 9/2012 | Lively et al. | |
| 8,262,774 B2 | 9/2012 | Liu | |
| 8,343,445 B2 | 1/2013 | Liu et al. | |
| 8,361,200 B2 | 1/2013 | Sayari et al. | |
| 8,414,853 B2 | 4/2013 | Liu et al. | |
| 8,685,223 B2 | 4/2014 | Kurashina et al. | |
| 8,715,393 B2 | 5/2014 | Wright et al. | |
| 8,815,063 B2 | 8/2014 | Haryu et al. | |
| 8,858,777 B2 | 10/2014 | Kaczur et al. | |
| 8,915,987 B2 | 12/2014 | Dressler | |
| 8,936,712 B2 | 1/2015 | Kurashina et al. | |
| 8,999,135 B2 | 4/2015 | Hinatsu et al. | |
| 8,999,279 B2 | 4/2015 | Wright et al. | |
| 9,061,237 B2 | 6/2015 | Eisenberger et al. | |
| 9,108,140 B2 | 8/2015 | Winsness | |
| 9,227,153 B2 | 1/2016 | Eisenberger | |
| 9,266,051 B2 | 2/2016 | Wright et al. | |
| 9,283,515 B2 | 3/2016 | Ogino | |
| 9,303,323 B2 | 4/2016 | DiMascio et al. | |
| 9,371,227 B2 | 6/2016 | Fan et al. | |
| 9,487,871 B2 | 11/2016 | Nakazawa | |
| 9,518,236 B2 | 12/2016 | Fan et al. | |
| 9,555,365 B2 | 1/2017 | Eisenberger et al. | |
| 9,630,143 B2 | 4/2017 | Eisenberger et al. | |
| 9,776,131 B2 | 10/2017 | Eisenberger | |
| 9,890,062 B2 | 2/2018 | Manabe et al. | |
| 9,919,261 B2 | 3/2018 | Westendorf et al. | |
| 10,053,783 B2 | 8/2018 | Haryu et al. | |
| 10,053,784 B2 | 8/2018 | Daimon et al. | |
| 10,053,786 B2 | 8/2018 | Ishikawa et al. | |
| 10,087,536 B2 | 10/2018 | Winther-Jensen et al. | |
| 10,183,251 B2 | 1/2019 | Aines et al. | |
| 10,233,081 B2 | 3/2019 | Little et al. | |
| 10,603,625 B1* | 3/2020 | Canino ................. | B01D 53/18 |
| 11,091,408 B2 | 8/2021 | Winkler et al. | |
| 11,105,003 B2 | 8/2021 | Lin | |
| 11,219,860 B1 | 1/2022 | Jakobsen | |
| 2002/0134234 A1 | 9/2002 | Kalbassi et al. | |
| 2007/0187247 A1 | 8/2007 | Lackner et al. | |
| 2009/0061267 A1 | 3/2009 | Monzyk et al. | |
| 2011/0041688 A1* | 2/2011 | Eisenberger ............ | F23J 15/02 95/107 |
| 2011/0296872 A1* | 12/2011 | Eisenberger ....... | B01D 53/0462 96/111 |
| 2015/0322580 A1 | 11/2015 | Little et al. | |
| 2017/0274371 A1 | 9/2017 | Little et al. | |
| 2019/0240621 A1 | 8/2019 | Torres et al. | |
| 2019/0359894 A1* | 11/2019 | Heidel .................. | B01J 19/245 |
| 2021/0061655 A1 | 3/2021 | El-Halwagi et al. | |
| 2021/0172074 A1 | 6/2021 | Hahn et al. | |

FOREIGN PATENT DOCUMENTS

| | | | |
|---|---|---|---|
| WO | 2008134871 A1 | 11/2008 | |
| WO | 2008151060 A1 | 12/2008 | |
| WO | 2017140954 A1 | 8/2017 | |
| WO | 2018112654 A1 | 6/2018 | |
| WO | 2019136374 A1 | 7/2019 | |
| WO | 2020020611 A1 | 1/2020 | |
| WO | 2020148460 A1 | 7/2020 | |
| WO | 2020163513 A1 | 8/2020 | |
| WO | WO-2020163513 A1 * | 8/2020 | ............ B01D 53/62 |
| WO | 2021089916 A1 | 5/2021 | |
| WO | 2021140680 A1 | 7/2021 | |

OTHER PUBLICATIONS

Stucki et al., "Coupled Water Electrolysis and CO2 Recovery for the Production of Methanol", ResearchGate, Conference Paper, Volume: Proceedings p. 309, The 9th World Hydrogen Conference Paris, 1992, 11 pages.

Saito et al., "Methanol synthesis from CO2 and H2 over a CuZnO-based multicomponent catalyst", ScienceDirect, Elsevier, Energy Conversion and Management, vol. 38, Supplement, 1997, pp. S403-S408, 2 pages.

Lackner et al., "Carbon Dioxide Extraction from Air: Is it an Option?", Los Alamos National Lab. (LANL), Conference: 24th Annual Technical Conference on Coal Utilization and Fuel Systems, 1999, 3 pages.

* cited by examiner

US 11,850,566 B2

SYNTHETIC FUEL PRODUCTION SYSTEM AND RELATED TECHNIQUES

CROSS-REFERENCE TO RELATED APPLICATIONS

This patent application claims the benefit of U.S. Provisional Patent Application No. 63/117,611, filed on Nov. 24, 2020, which is herein incorporated by reference in its entirety.

FIELD OF THE DISCLOSURE

The present disclosure relates to systems and techniques for synthetic fuel production and, more particularly, to producing a fuel from captured carbon dioxide ($CO_2$) and water electrolysis.

BACKGROUND

Methanol can be used in the production of gasoline through one or more methanol-to-gasoline (MTG) processes. In some cases, MTG synthesis can yield gasoline which is close to final fuel specifications, requiring minimal end processing. MTG synthesis generally can be considered an alternative to traditional Fischer-Tropsch (FT) synthesis, which instead uses a feedstock of syngas.

SUMMARY

The subject matter of this application may involve, in some cases, interrelated products, alternative solutions to a particular problem, and/or a plurality of different uses of a single system or article.

One example embodiment provides a fuel production system. The fuel production system includes a first portion in which carbon dioxide ($CO_2$) is extracted from a gas volume received by the system. The fuel production system also includes a second portion in which hydrogen ($H_2$) is generated from a water volume received by the system. The fuel production system also includes a third portion in which a fuel is produced from synthesis of the extracted $CO_2$ and the generated $H_2$.

In some cases, the gas volume includes ambient air. In some cases, the gas volume includes an output of an exhaust system. In some cases, the gas volume includes a biogas.

In some cases, the extraction of the $CO_2$ in the first portion involves aqueous alkaline sorbent gas capture. In some cases, the extraction of the $CO_2$ in the first portion involves a gas contactor of generally tubular shape. In some instances, the gas contactor has a substantially square or rectangular cross-section. In some instances, the gas contactor has a substantially circular or elliptical cross-section. In some instances, the gas contactor is configured to change shape during operation thereof. In some instances, the gas contactor includes a fabric. In some such instances, the fabric includes nylon.

In some cases, the generation of the $H_2$ in the second portion involves alkaline electrolysis. In some cases, in the second portion, hydrogen additionally is generated from water produced by the system.

In some cases, the system further includes a fourth portion in which the water volume received by the system is pre-treated before $H_2$ is generated therefrom. In some instances, the pre-treatment of the water volume in the fourth portion involves ion exchange-based pre-treatment.

In some cases, the third portion involves methanol-to-gasoline (MTG) synthesis. In some cases, the third portion involves Fischer-Tropsch synthesis.

In some cases, the system is further configured to receive input power from at least one of a power grid, an energy storage unit, an energy generating unit, and a chemical source of energy. In some instances, the energy generating unit is configured to harness at least one of solar energy and wind energy.

In some cases, the fuel includes a liquid fuel. In some instances, the fuel includes at least one of gasoline, diesel, and jet fuel. In some instances, the fuel includes dimethyl ether (DME).

In some cases, the system is modular. In some cases, the system occupies a space of less than or equal to about 5 $m^3$. In some cases, the system occupies a space of less than or equal to about 1 m×1 m×2 m. In some cases, the system has a mass of less than or equal to about 300 kg.

The features and advantages described herein are not all-inclusive and, in particular, many additional features and advantages will be apparent to one of ordinary skill in the art in view of the drawings, specification, and claims. Moreover, it should be noted that the language used in the specification has been selected principally for readability and instructional purposes and not to limit the scope of the inventive subject matter.

Figure 1:
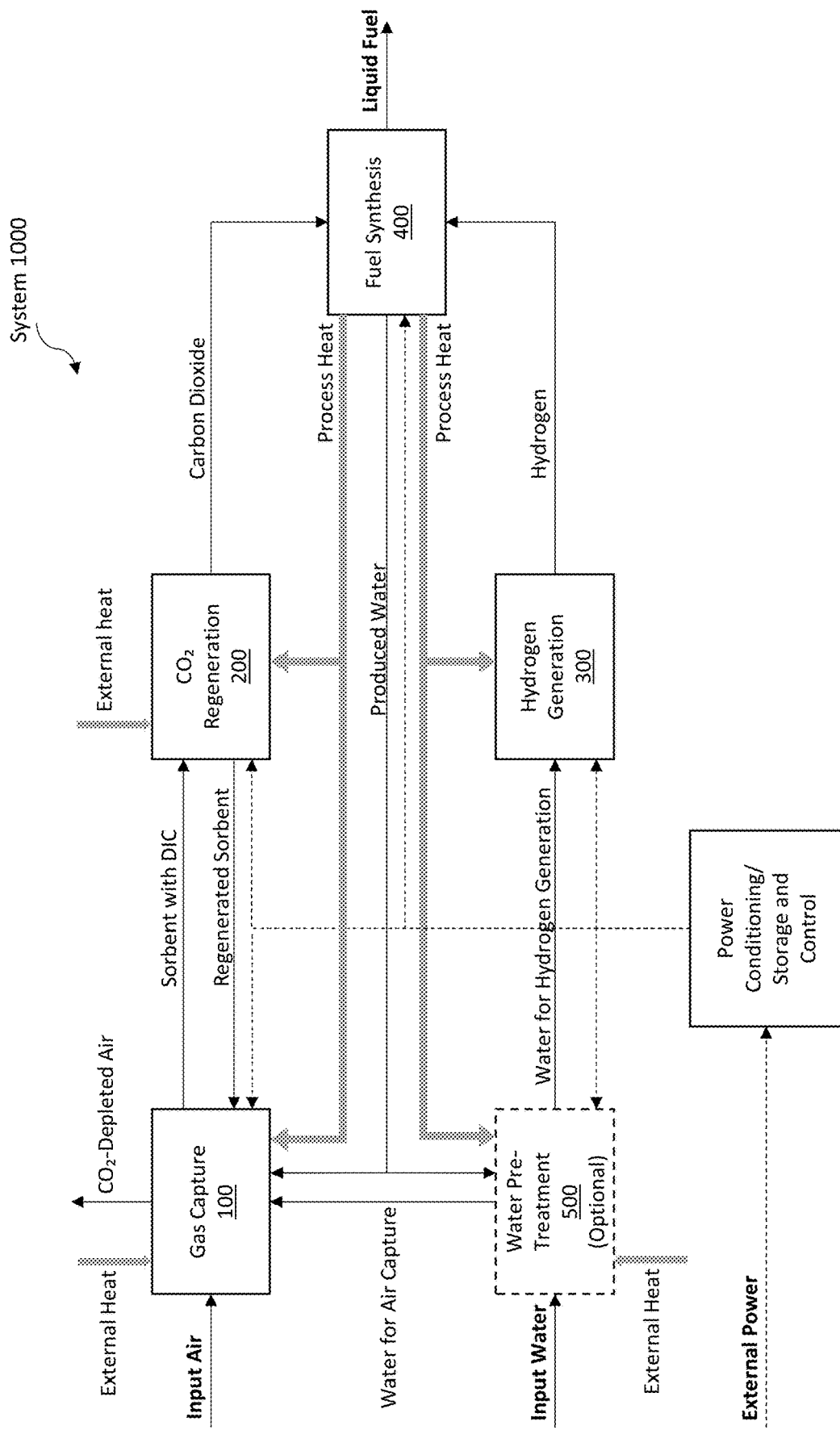
FIG. 1 is a block diagram illustrating a fuel production system configured in accordance with an embodiment of the present disclosure.

These and other features of the present embodiments will be understood better by reading the following detailed description, taken together with the figures herein described. In the drawings, each identical or nearly identical component that is illustrated in various figures may be represented by a like numeral. For purposes of clarity, not every component may be labeled in every drawing. Furthermore, as will be appreciated in light of this disclosure, the accompanying drawings are not intended to be drawn to scale or to limit the described embodiments to the specific configurations shown.

DETAILED DESCRIPTION

A synthetic fuel production system and related techniques are disclosed. In accordance with some embodiments, the disclosed system may be configured to produce a liquid fuel using carbon dioxide ($CO_2$) extracted from the air and hydrogen generated from aqueous solutions by electrochemical means (e.g., water electrolysis). In production of the fuel, the disclosed system may be configured, in accordance with some embodiments, to react the $CO_2$ and hydrogen, for example, to form methanol ($CH_3OH$). The disclosed system also may be configured, in accordance with some embodiments, to utilize one or more subsequent reaction steps to produce a given targeted set of hydrocarbons and partially oxidized hydrocarbons. For example, the disclosed system may be used to produce any one (or combination) of: ethanol ($C_2H_5OH$); dimethyl ether (DME) ($CH_3OCH_3$ or $C_2H_6O$); formic acid ($CH_2O_2$); formaldehyde ($CH_2O$); alkanes of various chain length; olefines; aliphatic and aromatic carbon compounds; and mixtures thereof, such as gasoline fuels, diesel fuels, and jet fuels. Numerous configurations and variations will be apparent in light of this disclosure.

General Overview

A combination of carbon constraints driven by climate change and the advent of intermittent but extremely cost-effective electric power suggests that the liquid fuels of the future are made from renewable energy and carbon taken from the environment. The inherent value of liquid fuels stems from their high energy density and ease of handling, transport, and storage. Batteries can provide energy for an all-electric car, but they are far heavier and far more difficult to manage than liquid fuel on board of a vehicle. Even for passenger cars, which are much more easily converted to batteries than heavy trucks, range anxiety persists.

These non-trivial difficulties can be avoided by providing clean synthetic fuels made from renewable energy, water, and $CO_2$ from the air. Taking the ingredients for fuel production (e.g., carbon and energy) from the environment at the point of use makes it possible to further enhance the advantages of liquid fuels by eliminating long and complex supply chains. Liquid fuels can be produced at the point of consumption.

Thus, and in accordance with some embodiments of the present disclosure, a synthetic fuel production system and related techniques are disclosed. In accordance with some embodiments, the disclosed system may be configured to produce a liquid fuel using carbon dioxide ($CO_2$) extracted from the air and hydrogen generated from aqueous solutions by electrochemical means (e.g., water electrolysis). In production of the fuel, the disclosed system may be configured, in accordance with some embodiments, to react the $CO_2$ and hydrogen, for example, to form methanol ($CH_3OH$). The disclosed system also may be configured, in accordance with some embodiments, to utilize one or more subsequent reaction steps to produce a given targeted set of hydrocarbons and partially oxidized hydrocarbons. For example, the disclosed system may be used to produce any one (or combination) of: ethanol ($C_2H_5OH$); dimethyl ether (DME) ($CH_3OCH_3$ or $C_2H_6O$); formic acid ($CH_2O_2$); formaldehyde ($CH_2O$); alkanes of various chain length; olefines; aliphatic and aromatic carbon compounds; and mixtures thereof, such as gasoline fuels, diesel fuels, and jet fuels.

As discussed herein, the disclosed system may be configured to take advantage of $CO_2$ concentrations in surrounding gaseous environments, in accordance with some embodiments. For instance, in at least some cases, the main source of $CO_2$ may be ambient air. As generally used herein, the term "ambient air" refers to unprocessed outdoor air whose $CO_2$ content is set by natural and anthropogenic fluxes exogenous to the disclosed system. On average, the concentration of $CO_2$ in ambient air is about 415 ppm by volume, though this number may vary locally and temporally, typically within about 10%. For instance, photosynthesis upstream of a $CO_2$ harvesting site may lower the $CO_2$ content of the downstream ambient air at such site. Conversely, natural respiration and/or industrial processes may add $CO_2$ to ambient air. Some indoor environments, including human-occupied spaces, may have limited exchange with ambient air and, as such, $CO_2$ concentrations may exceed 1,000 ppm and, in some cases, reach 10,0000 ppm. With some exhaust systems, $CO_2$ concentrations may exceed 200,000 ppm. As will be appreciated in light of this disclosure, the disclosed system may be configured, in accordance with some embodiments, to accommodate all (or some sub-set) of such $CO_2$ ranges and fluctuations, whether in ambient air or other gaseous environment.

As will be appreciated in light of this disclosure, the disclosed system may be extremely flexible regarding its design, both in terms of structural modifications and changes in operating procedures. In accordance with some embodiments, the disclosed system may be configured for stand-alone use, whereas in some other embodiments, multiple partial or complete systems may be in communication with one another and configured for joint operation. In accordance with some embodiments, the disclosed system may be configured for operation in a generally modular or granular fashion. That is, multiple instances of a given sub-process or unit (or of the whole system more generally) may be utilized as constituent parts of a single overall fuel production architecture. In accordance with some embodiments, the disclosed system may be configured for use in a substantially centralized fashion, whereas in some other embodiments, the disclosed system may be configured for use in a distributed fashion. In some cases, multiple instances of the disclosed system may be situated and operated side-by-side (or otherwise locally). In accordance with some embodiments, multiple (e.g., redundant) sub-units may be connected such that the failure of one constituent unit may be compensated for by other(s). In some embodiments, the disclosed system may be configured to be deployed or integrated, for example, at or near a garage associated with a home. Numerous suitable installation sites and arrangements will be apparent in light of this disclosure.

As will be further appreciated in light of this disclosure, the disclosed system may be configured for use in any of a wide variety of contexts. For instance, in an example case, a large source of $CO_2$ may exist locally, and a single $CO_2$ collector sub-system may feed multiple fuel producing sub-systems of the disclosed system. In another example case, a water pre-treatment sub-system may be centralized and feed multiple other sub-systems of the disclosed system. In general, the various sub-systems at a large installation may operate at different scales that may be individually optimized and may be interconnected in ways that combine and separate material and energy flows between sub-systems, in accordance with some embodiments.

In accordance with some embodiments, any (or all) of the individual sub-processes of the disclosed system may have a generally small physical scale and may be configured to operate at small operational scales. In some embodiments, the disclosed system may include a number of sub-processes and sub-systems configured to operate on a scale compatible with individual household consumption. For instance, the disclosed system may be configured for operating at the scale of fuel consumption typical for a typical single- or multi-automobile household. In accordance with some other embodiments, however, the disclosed system may be configured to operate at large operational scales. For example, multiple instances of the disclosed system (or a given sub-process thereof) may be combined in a modular or granular fashion to achieve large operational scales, in accordance with some embodiments.

Also, as will be appreciated in light of this disclosure, in at least some cases, the small and compact scale of the disclosed system may allow for convenient integration of certain sub-processes (e.g., thermal integration of separate and/or disparate sub-processes). In at least some cases, the small and compact scale of the disclosed system may permit ready integration with infrastructure available at the point of use (e.g., connected to home solar panels, connected to residential heat sources, etc.). In some instances, the disclosed system may be put into operation with only minor assembly and installation.

As will be further appreciated, the form factor of the disclosed system may be customized, as desired. In an example case, the disclosed system may weigh less than 300 kg. In an example case, the disclosed system may occupy a space of less than about 5 m³. In an example case, the disclosed system may occupy a space of about 1 m×1 m×2 m. In some instances, the disclosed system may be small enough to be transported using conventional passenger vehicles, such as vans and trucks. In some instances, the disclosed system may be sized to be transported using a standard 20-ft. or 40-ft. shipping container. Other suitable form factors for the disclosed system will depend on a given target application or end-use and will be apparent in light of this disclosure.

System Architecture and Operation:

FIG. 1 is a block diagram illustrating a fuel production system 1000 configured in accordance with an embodiment of the present disclosure. As can be seen, system 1000 may include several sub-processes, including gas capture 100, $CO_2$ regeneration 200, hydrogen generation 300, and fuel synthesis 400. In accordance with some embodiments, system 1000 also may include a water pre-treatment sub-process 500. Each of these sub-processes is discussed in turn below.

As described herein, system 1000 may be configured, in accordance with some embodiments, to receive input air, water, and electric power from various sources and to utilize those materials in producing a liquid fuel output. More generally, FIG. 1 illustrates communicative (e.g., flow) coupling of the various constituent elements of system 1000 and the overall flow of liquids, gases, and other materials within system 1000, in accordance with some embodiments. Coupling may be provided by tubes, valves, and/or other suitable connection means, as will be apparent in light of this disclosure. Also, it should be noted from the outset that waste streams (e.g., water that is produced) from various sources in system 1000 are not shown in FIG. 1 and that external heat inputs in some of the sub-processes may be implemented in some but not necessarily all embodiments.

As discussed herein, system 1000 may be adapted to output any of a wide range of hydrocarbon fuels. For example, in accordance with some embodiments, system 1000 may be configured to produce a stream of methanol, which subsequently may be converted into any one (or combination) of gasoline, industrial-quality methanol, methane, dimethyl ether (DME), diesel, kerosene, and jet fuel.

As used herein, "gasoline" generally may refer to any mixture of hydrocarbons substantially in the range $C_4$-$C_{12}$ and oxygenates that meet the definition of motor-grade gasoline in any specific locality. Generally, that means meeting the following criteria: (1) olefins<10% (v/v); (2) aromatics<35% (v/v); (3) benzene<1% (v/v); (4) research octane number (RON)>87; and (5) vapor pressure (kPa)= 72.5−T±7.5, where T is the minimum expected local temperature measured in degrees Celsius.

As used herein, "methanol" generally may refer to any mixture that comprises >99.85% by weight of the chemical compound methanol $CH_3OH$ and <0.1% by weight of the chemical compound $H_2O$.

As used herein, "dimethyl ether" (DME) generally may refer to any substance that comprises >99% by weight of the chemical compound dimethyl ether $CH_3$—O—$CH_3$.

As used herein, "jet fuel" generally may refer to any mixture of predominantly hydrocarbons that meet ASTM D1655-20 specifications. In cases where differentiation is needed or desired, a mixture may be referred to as a "certified jet fuel" if this classification has been verified by an authorized institution (e.g., ASTM International, United Kingdom Defence Standardization, Forsvarets Materielverk of Sweden, etc.) or as a "potential jet fuel" if the mixture satisfies all specifications at the locality of interest but has not yet been certified as such.

As used herein, "diesel" generally may refer to any mixture of predominantly hydrocarbons that meet the following criteria, and when separate options are offered, they refer to "summer diesel" and "winter diesel" (e.g., ambient temperature at location of use): (1) flash point >38° C.; (2) distillation temperatures 90% recovery either (a) T<288° C. or (b) 282° C.<T<338° C.; (3) kinematic viscosity ν (mm²/sec) either (a) 1.3<ν<2.4 or (b) 1.9<ν<4.1; (4) sulfur content <15 ppm by weight; and (5) cetane number>40.

In accordance with some embodiments, system 1000 may be used to collect $CO_2$ from the atmosphere, generate hydrogen from available water source(s), and synthesize a liquid fuel from the $CO_2$ and hydrogen, wherein the liquid fuel is substantially ready for consumption in a vehicle. In some cases, system 1000 may be configured, for example, to produce about 1-3 gal of gasoline (e.g., iso-octane benchmark) per day. It should be noted, however, that greater or lesser amounts of a given fuel may be produced via system 1000, as desired for a given target application or end-use.

Gas Capture Sub-Process:

As noted above, system 1000 may include a gas capture sub-process 100 through which $CO_2$ may be provided to system 1000 for use in producing a liquid fuel output. Such gas capture may involve obtaining $CO_2$ from any of a wide range of sources. For instance, in accordance with some embodiments, gas capture may involve obtaining $CO_2$ from any one (or combination) of ambient air, indoor air, air from enclosed spaces, exhaust volumes, biogas production volumes, and fermentation processes, to name a few options. In the example embodiment illustrated via FIG. 2 (discussed below), $CO_2$ is to be obtained, at least primarily, from ambient air. In some cases, system 1000 may be configured to operate exclusively on such $CO_2$ source(s), whereas in some other cases, system 1000 may be configured to augment its operation with $CO_2$ therefrom (if/when available). In accordance with some embodiments, one or more of these sources may be utilized in a fixed configuration. In accordance with some embodiments, access to additional and/or different sources may be provided, as desired for a given target application or end-use.

Generally, the gas capture sub-process 100 may utilize, in accordance with some embodiments, any suitable gas capture technology able to provide (1) a stream of carbonate/bicarbonate solution and/or (2) a gaseous stream of concentrated $CO_2$ at a pressure of a few atmospheres or more and which is substantially oxygen- and nitrogen-free. As will be appreciated in light of this disclosure, if the $CO_2$ arrives with too high a concentration of impurities, one or more cleanup stages may be utilized to remove such impurities and/or make up a shortfall in pressure. In accordance with some embodiments, system 1000 may receive oxidized carbon in a form that is sufficiently concentrated, such that $CO_2$ may be delivered for one or more processes of system 1000 that will utilize gaseous $CO_2$ at elevated pressure. In accordance with some embodiments, the gas capture sub-process 100 may make the output $CO_2$ available on demand and/or in a continuous stream. In accordance with some embodiments, the gas capture sub-process 100 may ensure that the output $CO_2$ does not contain detrimental contaminants (e.g., sulfur and nitrogen oxides). Depending on the input gas(es), the gas capture sub-process 100 may transmit to system 1000 partially or full reduced species of carbon, such as carbon monoxide (CO) or methane, for example, which optionally may be incorporated into one or more downstream processes (e.g., fuel synthesis), in accordance with some embodiments.

In accordance with some embodiments, capturing $CO_2$ from input air may be provided using functional chemical groups attached to solid or semi-solid substrates, which serve as sorbents. In accordance with some embodiments, liberating $CO_2$ from and regenerating such substrates may be done, for example, by manipulating the chemical and physical environment of the $CO_2$-loaded substrates. In accordance with some embodiments, $CO_2$ liberation may be provided, at least in part, by reducing the partial pressure of $CO_2$ above the sorbent (e.g., producing a pressure swing). In accordance with some embodiments, $CO_2$ liberation may be provided, at least in part, by increasing the temperature (e.g., producing a thermal swing). In accordance with some embodiments, the $CO_2$ concentration on/in the $CO_2$-loaded substrates may be determined by the water vapor pressure above the same (e.g., by measuring a moisture swing).

In accordance with some embodiments, system 1000 may be configured to operate with input air having a wide range of $CO_2$ concentrations. For instance, in some cases, system 1000 may be configured to make use of input air having a $CO_2$ concentration in the range of about 100-1,000 ppm of (e.g., about 100-250 ppm, about 250-500 ppm, about 500-750 ppm, about 750-1,000 ppm, or any other sub-range in the range of about 100-1,000 ppm). In some cases, system 1000 may be configured to make use of input air having a $CO_2$ concentration in the range of about 1,000-10,000 ppm (e.g., about 1,000-2,500 ppm, about 2,500-5.00 ppm, about 5,000-7,500 ppm, about 7,500-10,000 ppm, or any other sub-range in the range of about 1,000-10,000 ppm). In some cases, system 1000 may be configured to make use of input air having a $CO_2$ concentration in the range of about 300 ppm or less (e.g., about 200-300 ppm, about 100-200 ppm, about 100 ppm or less, or any other sub-range in the range of about 300 ppm or less). In some cases, system 1000 may be configured to make use of input air having a $CO_2$ concentration in the range of about 350-450 ppm (e.g., about 350-375 ppm, about 375-400 ppm, about 400-425 ppm, about 425-450 ppm, or any other sub-range in the range of about 350-450 ppm). In some cases, the input air may be substantially pure $CO_2$ (e.g., about 95% or greater). In some cases, the input air may be an admixture of $CO_2$ with amounts of water vapor, methanol vapor, and/or other gaseous compounds (e.g., hydrogen and/or CO). Other suitable $CO_2$ ranges for the input air for system 1000 will depend on a given target application or end-use and will be apparent in light of this disclosure. In a more general sense, and in accordance with some embodiments, system 1000 may be configured to flexibly accommodate wide variations in $CO_2$ concentrations in the gas(es) it collects.

In accordance with some embodiments, the $CO_2$ output of the gas capture sub-process 100 may be provided in any of a wide range of forms. For example, the $CO_2$ output may be provided, in accordance with some embodiments, as liquid $CO_2$, refrigerated liquid or dry ice, dissolved in water as carbonic acid, as carbonate or bicarbonate salt, or dissolved in organic solvent(s) already incorporated into the process stream(s) of system 1000. In accordance with some embodiments, the $CO_2$ may be stored, for example, in cold methanol, which has a high holding capacity for $CO_2$. Other suitable delivery forms for the $CO_2$ for system 1000 will depend on a given target application or end-use and will be apparent in light of this disclosure.

Figure 2:
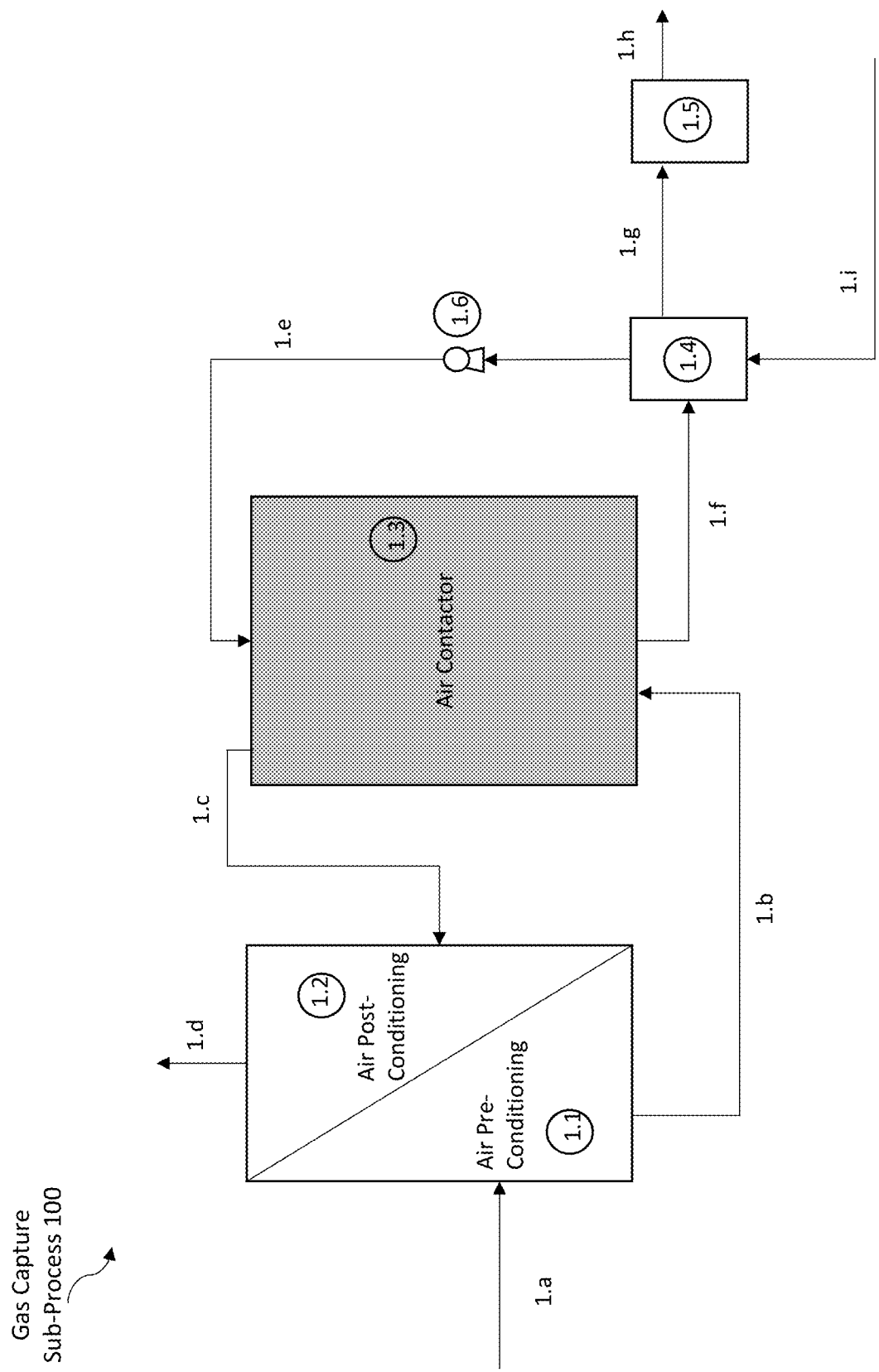
FIG. 2 is a block diagram illustrating an example gas capture sub-process of the fuel production system of FIG. 1, in accordance with an embodiment of the present disclosure.

FIG. 2 is a block diagram illustrating an example gas capture sub-process 100 of system 1000, in accordance with an embodiment of the present disclosure. As can be seen, a flow 1.*a* of input air may be received by gas capture sub-process 100. In some cases, flow 1.*a* may be (or otherwise may include) ambient air. In some other cases, flow 1.*a* may be (or otherwise may include) a gas from local source(s) with a $CO_2$ concentration greater than that of ambient air. In some such instances, these source(s) may be of periodically limited supply (e.g., indoor residential air) and, therefore, may be used periodically as a replacement for ambient air. Flow 1.*a* may be provided for downstream use (e.g., by gas contactor 1.3, discussed below). In accordance with some embodiments, flow 1.*a* may be delivered actively (e.g., blown using a fan) and/or via natural convection.

In some cases, flow 1.*a* optionally may undergo pre-conditioning 1.1. In accordance with some embodiments, pre-conditioning 1.1 may involve one or more ducts filled with one or more moisture-regulating and/or temperature-regulating media. For instance, in some cases, pre-conditioning 1.1 may include moisture-loaded media such that, if flow 1.*a* is relatively dry air, moisture may be released into it in passing over the moisture-loaded media. Thus, in a general sense, pre-conditioning 1.1 may serve, at least in part, to regulate moisture content in order to prevent (or otherwise reduce) water losses in the air flowing through the gas capture sub-process 100. In accordance with some embodiments, pre-conditioning 1.1 may involve exposing flow 1.*a* to sunlight (e.g., directly or indirectly, such as through a heat collector coupled with a heat exchanger) for a given period prior to entering gas contactor 1.3 as flow 1.*b*. In accordance with some embodiments, pre-conditioning 1.1 additionally (or alternatively) may involve filtration of particulates (e.g., sand, pollen, dust, etc.), adjustment of temperature, and/or removal of sour gas(es) (e.g., via sorbents or scrubbers for oxides of sulfur and nitrogen). The resultant flow 1.*b* may be provided for downstream use (e.g., by gas contactor 1.3, discussed below).

Flow 1.*b* (or flow 1.*a* if no pre-conditioning 1.1 is provided) may pass to gas contactor 1.3 (discussed below).

At this point, flow 1.b may be (or otherwise may include) a mixture of gases including a given amount of $CO_2$.

As can be seen further from FIG. 2, the gas capture sub-process 100 of system 1000 may involve a gas contactor 1.3. In general, gas contactor 1.3 may be configured to extract $CO_2$ from flow 1.b (or flow 1.a if no pre-conditioning 1.1 is provided) received thereby. To that end, the configuration of gas contactor 1.3 may be customized, as desired for a given target application or end-use. In general, the configuration of gas contactor 1.3 may be customized to provide a given target gas flow and flow of sorbent solution 1.e (discussed below) desired for a given target application or end-use.

Figure 3B:
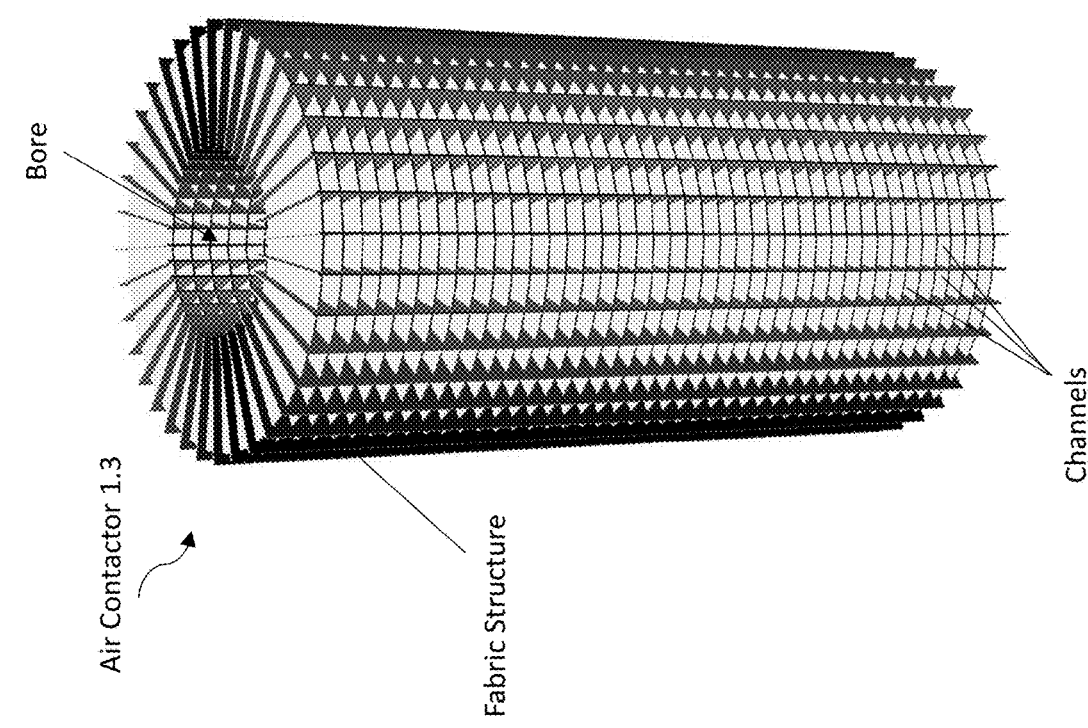
FIG. 3B illustrates a gas contactor configured in accordance with another embodiment of the present disclosure.
Figure 3A:
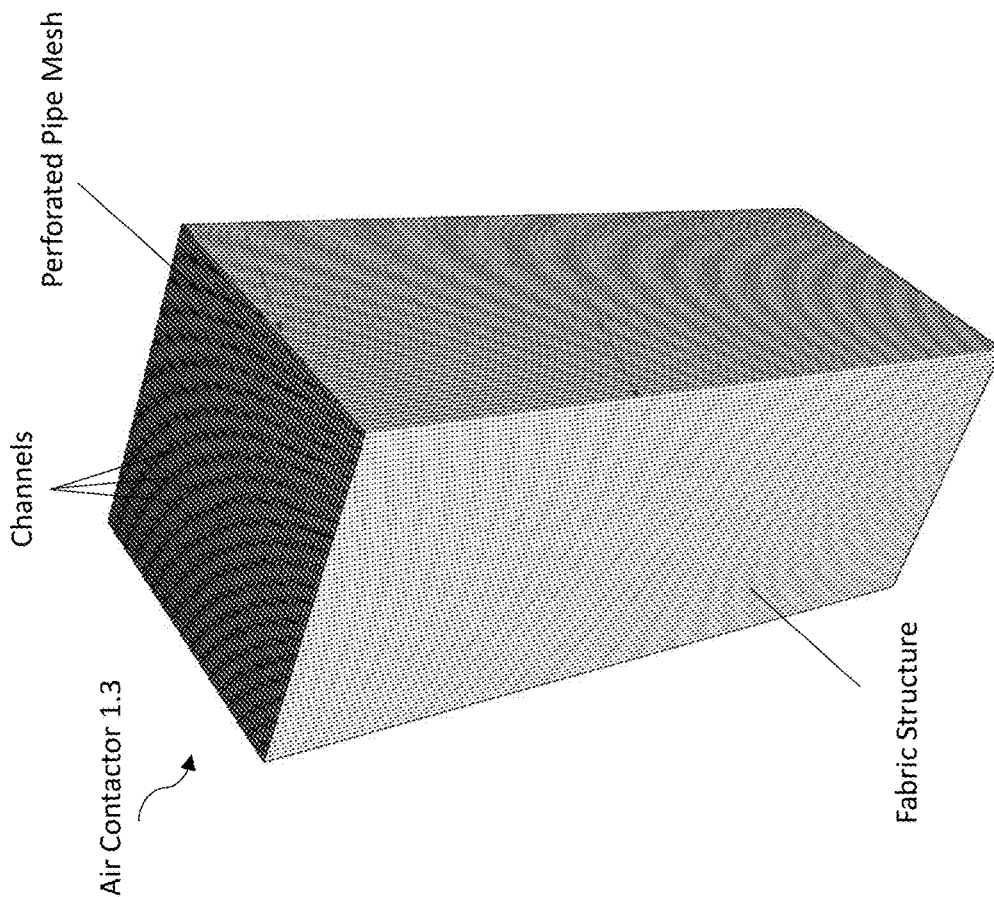
FIG. 3A illustrates a gas contactor configured in accordance with an embodiment of the present disclosure.

FIG. 3A illustrates a gas contactor 1.3 configured in accordance with an embodiment of the present disclosure. As can be seen from FIG. 3A, gas contactor 1.3 may be a generally box-like structure with channel (or channel-like structures) that allow gas to flow therethrough. Gas contactor 1.3 may include a fabric structure attached to a perforated pipe mesh, each discussed in turn below.

The fabric structure of gas contactor 1.3 may be of generally monolith-like construction, being formed (in part or in whole) from sheets of one or more fabrics, which have been woven and/or knitted, as desired. The constituent sheets of the fabric structure may share a single direction (e.g., in the plane of the sheet). Intersecting sheets may be joined, with threads/fibers from different sheets interpenetrating at the intersections.

The fabric structure may be constructed (in part or in whole) from material(s) which are: (1) readily wetted by an alkaline solution (e.g., sorbent solution 1.e, discussed below); and (2) stable in the presence of moisture and high pH (e.g., a strong hydroxide solution). Some example suitable materials may include nylon and polyethylene (e.g., high-density polyethylene or cross-linked polyethylene), to name a few options. In some cases, a flexible and/or stretchable material may be utilized. In some cases, a hard and/or substantially inelastic material may be utilized.

The constituent sheets of the fabric structure may intersect so as to create a plurality of channels extending therethrough. A given channel may be configured to allow flow 1.b (or flow 1.a if no pre-conditioning 1.1 is provided) to pass therethrough and leave the fabric structure. The surfaces of the channels may be configured to have sorbent solution 1.e (discussed below) flow there along. The longitudinal axis of a given channel may be aligned with a given desired direction (e.g., vertical, horizontal, or other). In accordance with some embodiments, the channels may be knitted in a manner permitting knitting branch points where several sheets merge into one or one sheet branches out into more than one. In some embodiments, narrower channels may be deployed while leaving openings between the channels to produce mixing and crossflow and closer contact with the channels. In some embodiments, the surfaces of the channels may include valves and/or funnels configured to slow and/or guide the flow of sorbent solution 1.e. In some embodiments, a perforated sheet may be provided across a given channel, providing another contact surface without preventing flow 1.b (or flow 1.a if no pre-conditioning 1.1 is provided) from passing through such channel.

The dimensions and geometry of a given channel may be customized, as desired for a given target application or end-use. In accordance with some embodiments, a given channel may be of generally rectangular (e.g., square), rhombic, triangular, or hexagonal cross-sectional geometry, for example. In some embodiments, a given channel may be substantially straight along its length. In some embodiments, a given channel may be curved or articulated at one or more locations along its length. In some embodiments, the fabric structure of gas contactor 1.3 may be constructed such that one or more dimensions of all (or some sub-set) of its channels may change during operation of gas contactor 1.3. In a specific example case, the fabric structure may include a plurality of channels measuring 0.5 cm×0.5 cm in cross-section. In a specific example case, gas contactor 1.3 may measure 100 cm×39 cm×39 cm externally. Other suitable configurations for the fabric structure of gas contactor 1.3 will depend on a given target application or end-use and will be apparent in light of this disclosure.

As noted above, the fabric structure of gas contactor 1.3 may be attached to a perforated pipe mesh. In accordance with some embodiments, the perforated pipe mesh may be configured to distribute sorbent solution 1.e (discussed below) within gas contactor 1.3. In an example case, the perforated pipe mesh may be configured to distribute sorbent solution 1.e evenly at the top of gas contactor 1.3. The geometry and dimensions of the perforated pipe mesh may be customized, as desired for a given target application or end-use. In an example case, the perforated pipe mesh may include a plate-like portion including a plurality of perforations that transition to a plurality of short pipes which extend into the fabric structure. Other suitable configurations for the perforated pipe mesh of gas contactor 1.3 will depend on a given target application or end-use and will be apparent in light of this disclosure.

In some cases, the combination of the fabric structure and the perforated pipe mesh may be sufficiently rigid for gas contactor 1.3 to be left freestanding. In some other cases, however, gas contactor 1.3 may require (or otherwise may benefit) from external and/or internal support. To that end, one or more support elements optionally may be included to help strengthen gas contactor 1.3. For example, in some cases, threads/fibers extending from the fabric structure (e.g., at corners and/or edges thereof) may provide point(s) for anchoring the fabric structure, thereby supporting gas contactor 1.3 more generally. If the fabric structure is constructed, for instance, from stretchable material(s), then such anchor point(s) also may be used in controlling the shape and volume of gas contactor 1.3. Other suitable support elements for gas contactor 1.3 will depend on a given target application or end-use and will be apparent in light of this disclosure.

In accordance with some embodiments, gas contactor 1.3 optionally may include one or more plates separating a given channel into a plurality of portions (e.g., upper and lower portions; upper and lower halves). In accordance with some embodiments, a given plate may be rigid or formed from a textile material, in part or in whole. In some cases, one separated portion (e.g., the upper portion) may incorporate one or more nozzles configured to wet (e.g., by spraying and/or dripping) surfaces of the fabric structure with sorbent solution 1.e (discussed below), while another separated portion (e.g., the lower portion) may be configured to collect sorbent solution 1.e dripping back into that channel. Other suitable plate elements for gas contactor 1.3 will depend on a given target application or end-use and will be apparent in light of this disclosure.

In some cases, the fabric structure (or gas contactor 1.3 more generally) may be of a geometry that is not readily captured in a cartesian coordinate form. For example, there may be provided an interwoven set of sheets that intersect in a manner that may be locally rectilinear, but the overall geometry may be better described in polar or cylindrical coordinates and the channels may be essentially aligned with the radial direction. For instance, consider FIG. 3B, which illustrates a gas contactor 1.3 configured in accordance with another embodiment of the present disclosure. As can be seen from FIG. 3B, gas contactor 1.3 may be a substantially cylindrical tubular structure having an inner bore and a body portion of annular cross-sectional geometry. Such a gas contactor 1.3 may include a fabric structure constructed as generally described above. The fabric structure may include a plurality of circular disks that intersect with the flat sheets aligned with the radial direction, with the center removed. In at least some cases, the normal of the disks of the fabric structure may be substantially tangential to the intersecting sheets. In accordance with some embodiments, a sprinkler (or other suitable means) may be disposed in the bore to deliver (e.g., by dripping and/or spraying) sorbent solution 1.e (discussed below) into the surrounding channels. To help to ensure that all parts of the channels may be wetted continuously and evenly, the fabric structure may be rotated, for example, along its longitudinal axis (e.g., horizontal axis) at a given speed.

In accordance with some embodiments, gas contactor 1.3 may be configured to be physically collapsed or folded into a given more-compact shape. More specifically, gas contactor 1.3 may be constructed such that it is foldable, flexible, bendable, and/or collapsible in a given desired manner. In accordance with some embodiments, the folding/collapse pattern may be determined, at least in part, by outside actuators, including threads pulling on the fabric structure of gas contactor 1.3 and built-in threads that pre-shape and pre-define the pattern. In cases where a non-elastic weave is employed, collapse thereof may be provided in any of a variety of ways. For instance, in one example approach, the vertical span in the direction of the channel axis may be shortened, resulting in buckling of the fabric structure. In some such cases, it may be desirable to generate a folding pattern so as to obtain a well-defined pattern as the fabric structure lays down in a zig-zag pattern, for instance. This may be accomplished with outside perturbations (e.g., protrusions from a wall) or mechanical devices (e.g., attached threads or textile materials) that move and push/pull the collapsing fabric structure into a given desired pattern. In another example approach, the fabric structure may be pre-stressed by including stiffer (or weaker) and longer (or shorter) threads that may control the collapse.

In some cases, gas contactor 1.3 may be configured to collapse in one of the horizontal dimensions, resulting in an essentially flat sheet that spans in the vertical direction. For example, for an overall square cross-sectional geometry, the square may be folded into a rhombic structure where two opposing angles tend to 180° and the other two toward 0°. In some instances, there may be substantially no stress or strain on the textile material. However, as will be appreciated in light of this disclosure, the degree of folding may be limited by the thickness and stiffness of the material.

For a given installation of system 1000, gas contactor 1.3 may be oriented as desired for a given target application or end-use. For instance, with the example gas contactor 1.3 of FIG. 3A, such gas contactor 1.3 may be configured to be situated such that its longitudinal axis is aligned substantially gravitationally vertically. With the example gas contactor 1.3 of FIG. 3B, such gas contactor 1.3 may be configured to be situated such that its longitudinal axis (e.g., its bore) is aligned substantially horizontally. Other suitable installation orientations for gas contactor 1.3 will depend on a given target application or end-use and will be apparent in light of this disclosure.

In accordance with some embodiments, gas contactor 1.3 generally may be configured to expose flow 1.b (or flow 1.a if no pre-conditioning 1.1 is provided) to a sorbent solution 1.e (discussed below), whereby $CO_2$ from flow 1.b/1.a transfers to sorbent solution 1.e. More specifically, in passing through a given channel of the fabric structure of gas contactor 1.3, flow 1.b/1.a may be exposed to sorbent solution 1.e present in the fabric of the fabric structure, in accordance with some embodiments. With the example gas contactor of FIG. 3A, flow 1.b/1.a may enter gas contactor 1.3 via one end (e.g., a lower end) of its fabric structure and distribute itself substantially linearly along the channels of the fabric structure, flowing along the surfaces of the channels and exiting at the exterior of the fabric structure. Sorbent solution 1.e may enter gas contactor 1.3 via a different end (e.g., an upper end) of its fabric structure and flow counter-current to flow 1.b/1.a. With the example gas contactor of FIG. 3B, flow 1.b/1.a may enter gas contactor 1.3 via the bore of its fabric structure and distribute itself substantially radially along the channels of the fabric structure, flowing along the surfaces of the channels and exiting at the exterior of the fabric structure. Sorbent solution 1.e may enter the bore of the fabric structure of gas contactor 1.3 (e.g., via a sprinkler or other distribution means) and flow in the same current direction as flow 1.b/1.a. In some cases, it may be desirable to agitate flow 1.b/1.a within gas contactor 1.3 so as to effectively thin the boundary layer provided between neighboring channels.

To maximize (or otherwise increase) the opportunity for contact between flow 1.b/1.a and sorbent solution 1.e, it may be desirable to maximize (or otherwise increase) the total textile surface area exposed in gas contactor 1.3. In some embodiments, gas contactor 1.3 may have a total exposed surface area in the range of about 20-500 $m^2$ (e.g., about 20-100 $m^2$, about 100-250 $m^2$, about 250-500 $m^2$, or any other sub-range in the range of about 20-500 $m^2$). In some cases, threads/fibers may be added to the weave of the fabric structure to provide additional surface area for contact within gas contactor 1.3. For instance, such additional threads/fibers may be woven in a direction parallel to the channel axis formed by the intersecting sheets at and near the intersections of sheets. In some embodiments, threads/fibers that cross the open channels may be introduced either at right angle to the channel axis or at a shallow angle and may be used, for example, to increase the contact area between textile and air. In some embodiments, gas contactor 1.3 may have a textile surface area-to-volume ratio, for example, in the range of about 40-4,000 $m^2/m^3$ (e.g., about 40-1,000 $m^2/m^3$, about 1,000-2,500 $m^2/m^3$, about 2,500-4,000 $m^2/m^3$, or any other sub-range in the range of about 40-4,000 $m^2/m^3$). In some embodiments, gas contactor 1.3 may include one or more channels having a width (or other dimension), for example, in the range of about 1-100 mm (e.g., about 1-25 mm, about 25-50 mm, about 50-75 mm, about 75-100 mm, or any other sub-range in the range of about 1-100 mm).

As previously noted, the gas capture sub-process 100 of system 1000 may involve use of a sorbent solution 1.e. In accordance with some embodiments, sorbent solution 1.e may serve to trap gaseous $CO_2$ as bicarbonates and/or carbonates. To that end, sorbent solution 1.e may be of a chemical composition which readily absorbs $CO_2$. For example, sorbent solution 1.e may be (or otherwise may include) an alkaline aqueous solution, such as a potassium hydroxide (KOH) brine. In accordance with some embodiments, sorbent solution 1.e may be (or otherwise may include) an alkaline aqueous solution having a concentration of $OH^-$ in the range of about 0.1-4 M and a concentration of $CO_3^{-2}$ in the range of about 0.05-2 M. In some cases, additional compound(s) (e.g., hygroscopic compounds such as amines, salts of sulfate, salts of sulfamate, etc.) may be added to sorbent solution 1.e, for instance, to reduce the water vapor pressure of the solution. In some cases, sorbent solution 1.e may include one or more compounds that provide inert but additional charge carriers for the downstream $CO_2$ regeneration sub-process 200 of system 1000. In some instances, the specific chemical composition of sorbent solution 1.e may be selected to improve the overall tolerance of system 1000 to sulfates in sorbent solution 1.e and ways of removing sulfates therefrom.

In some cases, sorbent solution 1.e may have an equilibrium water vapor pressure about equal to or less than pure water. For example, if sorbent solution 1.e is a potassium hydroxide/carbonate solution with less than 1 mol of potassium per liter, then the water vapor pressure at room temperature may be close to that of pure water. If, however, sorbent solution 1.e is a 5-molar KOH solution, then the water vapor pressure at room temperature may be several times lower than that of pure water. Thus, as will be appreciated, by choosing certain ions in sorbent solution 1.e, it may be possible to manipulate the water vapor concentration thereover, in accordance with some embodiments.

If sorbent solution 1.e is hygroscopic, then its water content may adjust itself such it is in equilibrium with ambient air. Therefore, sorbent solution 1.e may collect water when the outside humidity increases and release water when the outside humidity decreases. Thus, on average, system 1000 may neither gain nor lose water but may change its water content as weather conditions change. It should be noted, however, that changes in relative humidity and/or temperature may affect the volume of sorbent solution 1.e. As such, it may be desirable to have one or more reservoirs (e.g., reservoir 1.4, discussed below) for sorbent solution 1.e that provides flexibility in total volume.

Sorbent solution 1.e may be delivered to gas contactor 1.3 (e.g., by being drawn from a reservoir 1.4 via a pump 1.6, each discussed below). Under the action of gravity, sorbent solution 1.e may be permitted to flow through gas contactor 1.3. More specifically, with the example gas contactor 1.3 of FIG. 3A, sorbent solution 1.e may flow gravitationally downward from the top to the bottom of the fabric structure thereof. With the example gas contactor of FIG. 3B, sorbent solution 1.e may flow gravitationally downward from the bore, through the fabric structure thereof. As previously noted, sorbent solution 1.e may be made to contact flow 1.b/1.a within gas contactor 1.3. As will be appreciated, in absorbing $CO_2$, the pH of sorbent solution 1.e may be lowered. After having flowed through the fabric structure, sorbent solution 1.e may be collected outside of gas contactor 1.3 (e.g., via a catch tray or other suitable means) and drained away as flow 1.f.

As can be seen further from FIG. 2, the gas capture sub-process 100 of system 1000 may involve one or more reservoirs 1.4, 1.5. In accordance with some embodiments, reservoir 1.4 may be configured to serve as the primary reservoir for sorbent solution 1.e actively circulating from gas contactor 1.3. In accordance with some embodiments, gas contactor 1.3 may be periodically submerged (in part or in whole) in reservoir 1.4. In this manner, $CO_2$-rich sorbent solution 1.e (hosted by gas contactor 1.3) may pass as flow 1.f to reservoir 1.4, where it may be exchanged with leaner sorbent solution 1.e present in reservoir 1.4. In some cases, reservoir 1.4 may be in flow communication with the return stream from the $CO_2$ regeneration sub-process 200 (discussed below) of system 1000, receiving flow 1.i therefrom.

In accordance with some embodiments, reservoir 1.4 may be configured to be drained periodically to downstream reservoir 1.5 as flow 1.g therebetween. Such draining may occur, for example, once the $CO_2$ content has reached a sufficiently high level (e.g., when >90% of the initial hydroxides have been converted/replaced by carbonates/bicarbonates or when the solubility of bicarbonates/carbonates is reached). In accordance with some embodiments, reservoir 1.5 may be configured to serve as the primary reservoir for $CO_2$-rich sorbent solution 1.e coming from upstream reservoir 1.4. In some cases, reservoir 1.5 may be in flow communication with the $CO_2$ regeneration sub-process 200 (discussed below) of system 1000, outputting flow 1.h thereto.

Also, as can be seen from FIG. 2, the gas capture sub-process 100 of system 1000 may involve a pump 1.6. Pump 1.6 may be configured to deliver sorbent solution 1.e to gas contactor 1.3 in a continuous or intermittent manner, as desired for a given target application or end-use. In accordance with some embodiments, pump 1.6 may deliver sorbent solution 1.e to all or some sub-set of the channels of gas contactor 1.3 at any given time. In some instances, the subset of channels may be changed, for example, periodically or quasi-periodically to cover all channels over time. In accordance with some embodiments, pump 1.6 may be configured to circulate sorbent solution 1.e from gas contactor 1.3 to post-conditioning 1.2 (discussed below).

In some cases, sorbent solution 1.e may be sufficiently enriched with $CO_2$ after a single pass through gas contactor 1.3. In such instances, reservoir 1.5 optionally may be omitted, and pump 1.6 may pump the $CO_2$-enriched sorbent solution 1.e directly away from reservoir 1.4 to the downstream $CO_2$ regeneration sub-process 200. In some other cases, multiple passes of sorbent solution 1.e through gas contactor 1.3 may be preferred to reach a given target $CO_2$ enrichment level for sorbent solution 1.e. In some instances, sorbent solution 1.e which has been previously exposed may be exposed to gas with a higher $CO_2$ concentration than sorbent solution 1.e which has not yet collected $CO_2$.

In accordance with some embodiments, gas contactor 1.3 may output a flow 1.c. Flow 1.c may be (or otherwise may include) a mixture of gases including less $CO_2$ than flow 1.b (or flow 1.a if no pre-conditioning 1.1 is provided) entering gas contactor 1.3. The reduction in $CO_2$ may be, for example, as low as 10% or as high as 90% (or more). As will be appreciated in light of this disclosure, the amount of reduction in $CO_2$ concentration may depend, at least in part, on the cost of air flow through gas contactor 1.3. In some cases, flow 1.c may be vented to the atmosphere, whereas in some other cases, flow 1.c may be provided for downstream post-conditioning 1.2 (discussed below) or other use. In accordance with some embodiments, flow 1.c may be delivered actively (e.g., blown using a fan) and/or via natural convection.

As noted above, in some cases, flow 1.c optionally may undergo post-conditioning 1.2. In accordance with some embodiments, post-conditioning 1.2 may involve one or more ducts filled with one or more moisture-regulating media. For instance, in some cases, post-conditioning 1.2 may include moisture-lean media such that, if flow 1.c is relatively moist air, moisture may be pulled from it in passing over the moisture-lean media. Thus, in a general sense, post-conditioning 1.2 may serve, at least in part, to regulate moisture content in order to prevent (or otherwise reduce) water losses in the air flowing through the gas capture sub-process 100. In some cases, the resultant flow 1.d may be vented to the atmosphere, whereas in some other cases, flow 1.d may be provided for downstream use. As will be appreciated in light of this disclosure, because the moisture-regulating media may be loaded in the input stage (e.g., at pre-conditioning 1.1) and dried in the output stage (e.g., at post-conditioning 1.2), the air flow direction may be swapped so that the input becomes the output and vice versa, in accordance with some embodiments. Additionally (or alternatively) the media may be swapped, in accordance with some embodiments. In some instances of a lung-like breathing configuration, for example, the transition may happen at each step.

Flow 1.d (or flow 1.c if no post-conditioning 1.2 is provided) may pass from system 1000, being vented safely to the atmosphere. At this point, flow 1.d may be (or otherwise may include) a mixture of gases including nitrogen and oxygen, possibly with one or more other trace gases.

In accordance with some embodiments, the $CO_2$ regeneration sub-process 200 (discussed below) of system 1000 may be operating concurrently with gas contactor 1.3 and, thus, there may be no need for reservoirs 1.4, 1.5. In accordance with some embodiments, $CO_2$ regeneration may rely on intermittent power and, therefore, may be asynchronous with gas capture. In such cases, reservoir(s) before and after $CO_2$ regeneration may be designed to accommodate the required storage capacity, which may depend on the expected delay between collection and regeneration.

In accordance with some embodiments, system 1000 may be water-balanced, such that impurities may not become more concentrated because of evaporation. As such, the average concentration of impurities may increase only if the input air or system 1000 itself delivers such impurities to system 1000. For example, the input air (flow 1.a) may carry sour gases other than $CO_2$ (e.g., sulfur dioxide, $SO_2$), which may be collected by the gas capture sub-process 100. If the sour gas is a stronger acid than $CO_2$, then it gradually may saturate sorbent solution 1.e. Thus, as will be appreciated, it may be desirable to remove sour gas(es) for the gas capture sub-process 100 when possible. In accordance with some embodiments, pre-conditioning 1.1 (discussed above) may be involved in removing sour gas(es) prior to $CO_2$ collection. Additionally (or alternatively) issues related to sour gas(es) may be addressed, for example, with cleaning up the regenerated potassium hydroxide brine (discussed below), in accordance with some embodiments.

In some embodiments, the input air for system 1000 may flow through channels (e.g., of gas contactor 1.3) and/or packed beds (e.g., of pre-conditioning portion 1.1 and/or post-conditioning portion 1.2) that create a moisture front in the air passing through. Air moving into a given chamber may push the front inward, whereas air coming out from that chamber may push the front back. In accordance with some embodiments, additional water may be added in the chamber, creating a tendency for the front to move faster on the way out.

In some embodiments, the inward-flowing air and outward-flowing air may utilize two distinct channels in system 1000. In this case, the flow may be continuous. In some embodiments, system 1000 may be configured to breathe such that, in one part of the gas capture sub-process 100, collected gas (e.g., air) is moving into gas contactor 1.3, while in another part of the gas capture sub-process 100, collected gas (e.g., air) is returned through the same cycle. If such a system 1000 is designed to create a moving front in a moisture sorbent bed, then the front may move back and forth in every cycle. Second-order effects may decide whether the front, on average, moves inward or outward. Feedback loops may be utilized to balance such behavior. If the air on the inside still picks up water from sorbent solution 1.e, then the net result may be an outward-moving front. If the air delivers water to the inside, then the net result may be an inward-moving front. If the air entering is heated, then it may be more efficient in drying the inlet and may push moisture inward more efficiently. On the other hand, if heat is added to the sorbent side of gas contactor 1.3, then the duct may be more efficient in pushing moisture out. Thus, and in accordance with some embodiments, solar and/or process heat (from elsewhere in system 1000) may be used to control this behavior. In some embodiments, the incoming air may pass through one or more ducts, which are heated (e.g., by sunlight or otherwise), thereby raising the temperature of the incoming air, which allows it to absorb moisture from the moisture-regulating media more readily.

If the flow is continuous and uses separate inlet and outlet channels, then the same strategy may be used to adjust the speed with which the two fronts move, so as to achieve breakthrough at comparable times. Consequently, the flow may be reversed periodically, without accumulating or depleting water in the channel system. In accordance with some embodiments, sensor(s) that measure temperature and/or moisture content of the water sorbent in the channel may provide efficient means of determining the location of the front. In accordance with some embodiments, temperature probe(s) may provide an efficient means for noting the front moving by the probe(s).

As will be appreciated in light of this disclosure, it may be desirable, at least in some instances, to avoid stagnant layers or volumes of $CO_2$-depleted air in the gas capture sub-process 100. Doing such may maximize (or otherwise) improve efficiency, at least in some cases. In accordance with some embodiments, this may be achieved by continuously or intermittently expanding and contracting parts of the gas capture volume in a manner like that of a lung.

In accordance with some embodiments, elastic materials may be used to introduce time constants of expansion, which may promote better mixing of air inside gas contactor 1.3. For example, the change in diaphragm position may cause an increase in volume in two sub-parts of the chamber, but a dividing wall between them may slow response to the change. As a result, air first may enter one side and then be transferred slowly to the other side as internal volumes readjust themselves. In some embodiments, a chamber with a diaphragm that moves to increase and decrease the chamber volume in a regular fashion may be utilized, providing a sort of "breathing design" for the gas capture sub-process 100 of system 1000.

$CO_2$ Regeneration Sub-Process:

As noted above, system 1000 also may include a $CO_2$ regeneration sub-process 200 through which $CO_2$ may be obtained for use in producing a liquid fuel output. In accordance with some embodiments, the $CO_2$ regeneration sub-process 200 may involve acidifying a carbonate/bicarbonate solution, outgassing $CO_2$, and regenerating the alkalinity of the solution for its return to the gas capture sub-process 100 of system 1000. In accordance with some other embodiments, the $CO_2$ regeneration sub-process 200 may involve capturing $CO_2$ using functional chemical groups attached to solid or semi-solid substrate-based sorbents, liberating $CO_2$ therefrom, and regenerating such substrates for their return to the gas capture sub-process 100 of system 1000.

In accordance with some embodiments, if the incoming flow received by the $CO_2$ regeneration sub-process 200 includes a carbonate/bicarbonate solution, then the $CO_2$ may be released in gaseous form by acidifying that flow such that the pH drops to about 8 or less (e.g., about 5 or less). Then, the equilibrium state of carbon may be as a mixture of dissolved $CO_2$/carbonic acid and bicarbonate, with the amount of dissolved $CO_2$ seeking equilibrium with the $CO_2$ in the gas phase above the solution. Thus, by keeping the partial pressure of $CO_2$ in the atmosphere above the solution below equilibrium levels (e.g., by sweeping away the gas in the atmosphere above the solution or manipulating the total pressure in the atmosphere above the solution), $CO_2$ may continue to come out of solution.

In accordance with some embodiments, acid may be added to part of the solution using electrochemical means of separating the solution into an alkaline component and an acidic component. In effect, this may happen if (1) cations flow to the cathode, where hydrogen may be removed from the solution, leaving behind hydroxide, and (2) anions flow to the anode, where oxygen is produced, leaving behind protons. If the anion is a carbonate or bicarbonate ion, then it may react with the proton emanating from the anode and be converted first to bicarbonate and then to neutral carbonic acid, which dissociates mainly into dissolved $CO_2$ and $H_2O$. If the partial pressure of $CO_2$ over the solution is sufficiently small, then the dissolved $CO_2$ may outgas from the solution and, under the influence of gravity, move into the headspace of the solution. It should be noted, however, that some dissolved $CO_2$ may be retained in the solution because its Henry's constant is large and the kinetics for outgassing are slow. In accordance with some embodiments, the oxygen and hydrogen produced inside such an electrochemical device may be outgassed during the electrochemical process, while $CO_2$ may be retained in solution. In such cases, the $CO_2$ still may be removed, for example, in a separate chamber with reduced gas pressures. In accordance with some embodiments, the produced oxygen and hydrogen may remain in solution with the $CO_2$ for downstream outgassing of hydrogen and oxygen first, followed by subsequent outgassing of $CO_2$. As will be appreciated in light of this disclosure, either approach may take advantage of the different values of Henry's constant for the noted gases.

In accordance with some embodiments, the production of hydrogen and water (e.g., via electrolysis) and the production of $CO_2$ may be integrated into a single process step or device. This may be possible, at least in part, because the electrochemical separation of acid and base may utilize electrodes that naturally produce hydrogen and oxygen. As will be appreciated in light of this disclosure, electrochemical inefficiencies which normally would manifest themselves as an electrode overpotential may be reduced in such an approach. Thus, a combined process step or device that produces $CO_2$, $H_2$, and $O_2$ may avoid duplicating many of these overpotentials that otherwise would happen if the processes were separate. Moreover, as will be further appreciated, by integrating as noted, the inefficiencies effectively may be paid for once rather than twice, as would happen otherwise with two separate steps/devices. From the perspective of hydrogen production, the energy going into the separation of $CO_2$ may be viewed as another overpotential. However, this energy cost may be required, as the separation utilizes an energy input. From the perspective of the $CO_2$ production, the energy consumption in producing hydrogen may be large and justified because $CO_2$ and $H_2$ are required in stoichiometric ratios. Because the combined system pays all other overpotentials only once (rather than twice as it would for two separate devices), the combined energy efficiency of splitting water into hydrogen and oxygen and producing $CO_2$ in the integrated process step or device may be very high.

Figure 4:
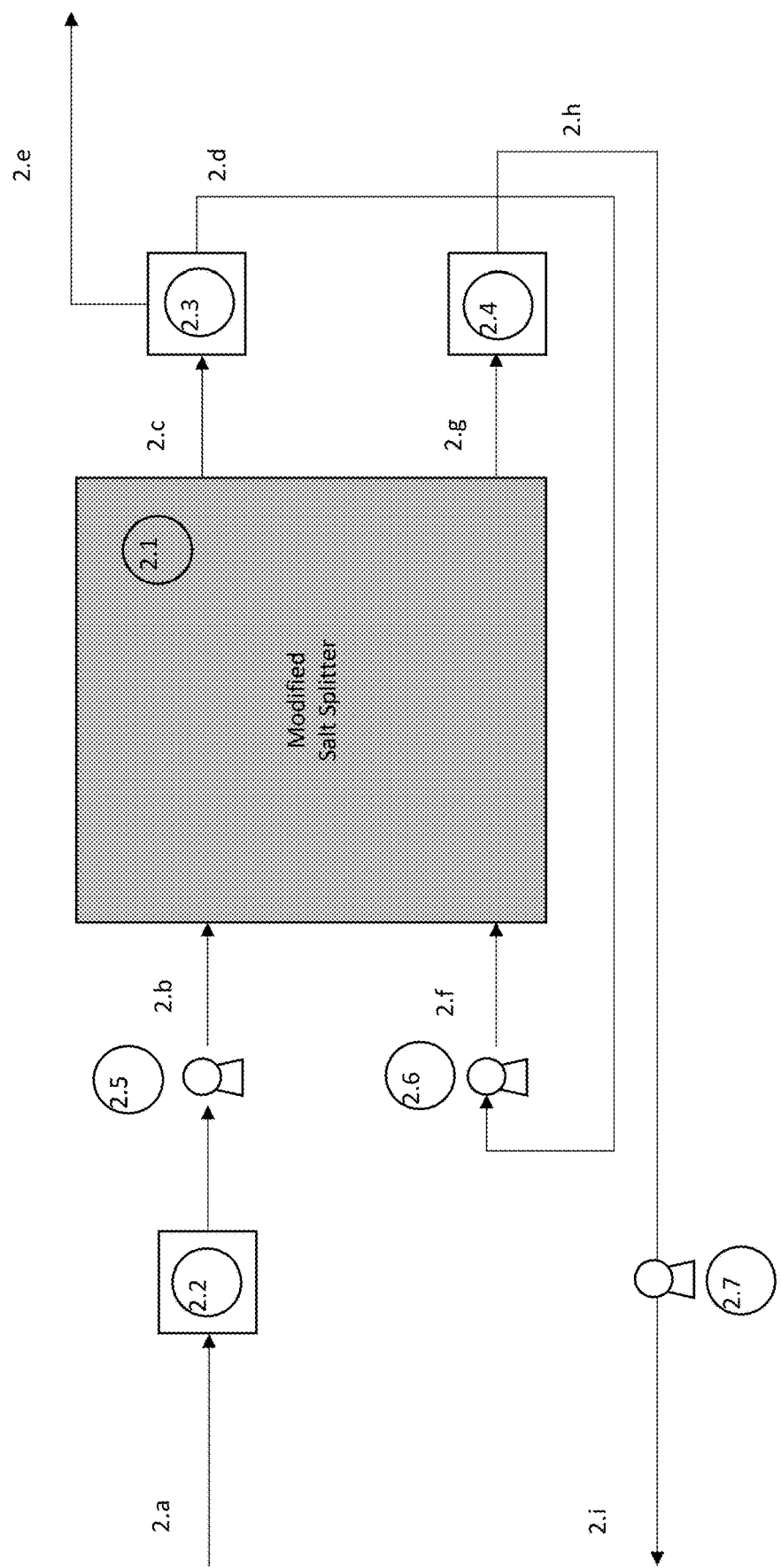
FIG. 4 is a block diagram illustrating an example $CO_2$ regeneration sub-process of the fuel production system of FIG. 1, in accordance with an embodiment of the present disclosure.

FIG. 4 is a block diagram illustrating an example $CO_2$ regeneration sub-process 200 of system 1000, in accordance with an embodiment of the present disclosure. As can be seen, a flow 2.*a* (e.g., provided from the gas capture sub-process 100 of system 1000) may be received by the $CO_2$ regeneration sub-process 200. In accordance with some embodiments, the captured carbon in flow 2.*a* may be in an altered chemical state in a liquid stream (e.g., aqueous bicarbonate and/or carbonate). In some such cases, flow 2.*a* may include dissolved inorganic carbon (DIC) having a concentration in the range of about 0.05-2 M. In some cases, flow 2.*a* also may include one or more inert anions (e.g., sulfate, sulfamate, etc.) having a concentration in the range of about 0.1-1 M. Additionally, in some cases, flow 2.*a* may include one or more cations (e.g., potassium and/or sodium). In some cases, flow 2.*a* further may include other species, which generally may be inert (e.g., other than lowering the water vapor pressure of the solution). Flow 2.*a* may have a pH in the range of about 9-14. In accordance with some other embodiments, the captured carbon in flow 2.*a* may be physisorbed, adsorbed, or absorbed to a physical substrate (e.g., a solid or semi-solid substrate-based sorbent). In accordance with some other embodiments, the captured carbon may be part of a gaseous mixture.

Also, as can be seen from FIG. 4, the $CO_2$ regeneration sub-process 200 may involve a reservoir 2.2. In accordance with some embodiments, reservoir 2.2 may be configured to receive flow 2.*a* and to output the same.

As can be seen further from FIG. 4, the $CO_2$ regeneration sub-process 200 may involve a pump 2.5. In accordance with some embodiments, pump 2.5 may be configured to receive flow 2.*a*, elevate its pressure, and output a flow 2.*b* (discussed below). In accordance with some embodiments, pump 2.5 may be configured to elevate the pressure of flow 2.*b* to be about equal to the operating pressure of modified salt splitter 2.1 (discussed below).

Flow 2.*b* may be of substantially the same chemical composition as flow 2.*a*. In some cases, potassium sulfate may be added to flow 2.*b*. As previously noted, flow 2.*b* may be at a pressure about equal to the operating pressure of modified salt splitter 2.1 (discussed below). The flow rate of flow 2.*b* may depend on one or more factors, including (1) a given target DIC concentration and (2) a given target overall $CO_2$ productivity. Thus, in some cases, the flow rate of flow 2.*b* may be, for example, in the range of about 1-100 mL/s (e.g., about 1-25 mL/s, about 25-50 mL/s, about 50-75 mL/s, about 75-100 mL/s, or any other sub-range in the range of about 1-100 mL/s).

As can be seen from FIG. 4, the $CO_2$ regeneration sub-process 200 also may involve a modified salt splitter 2.1. In accordance with some embodiments, modified salt splitter 2.1 may be configured to receive flow 2.*b* and perform bipolar membrane electrodialysis (ED) thereon. To that end, modified salt splitter 2.1 may include one or more bipolar membrane ED stacks (discussed below).

The operating pressure of modified salt splitter 2.1 may be customized, as desired for a given target application or end-use. For example, in some cases, modified salt splitter 2.1 may be operated at a pressure in the range of about 10-60 bars (e.g., about 10-35 bars, about 35-60 bars, or any other sub-range in the range of about 10-60 bars).

Also, the total surface area of the bipolar membrane of a given bipolar membrane ED stack may be customized, as desired for a given target application or end-use. For example, in some cases, the bipolar membrane may have a total surface area in the range of about 0.1-10 m² (e.g., about 0.1-2.5 m², about 2.5-5.0 m², about 5.0-7.5 m², about 7.5-10 m², or any other sub-range in the range of about 0.1-10 m²). In some cases, the cationic membrane also may have a total area in such range. If, for example, a channel and membrane width of 1 mm is provided, then the total volume may be in the range of about 0.1-10 L (e.g., about 0.1-2.5 L, about 2.5-5 L, about 5-7.5 L, about 7.5-10 L, or any other sub-range in the range of about 0.1-10 L) for the bipolar membrane area.

Figure 5:
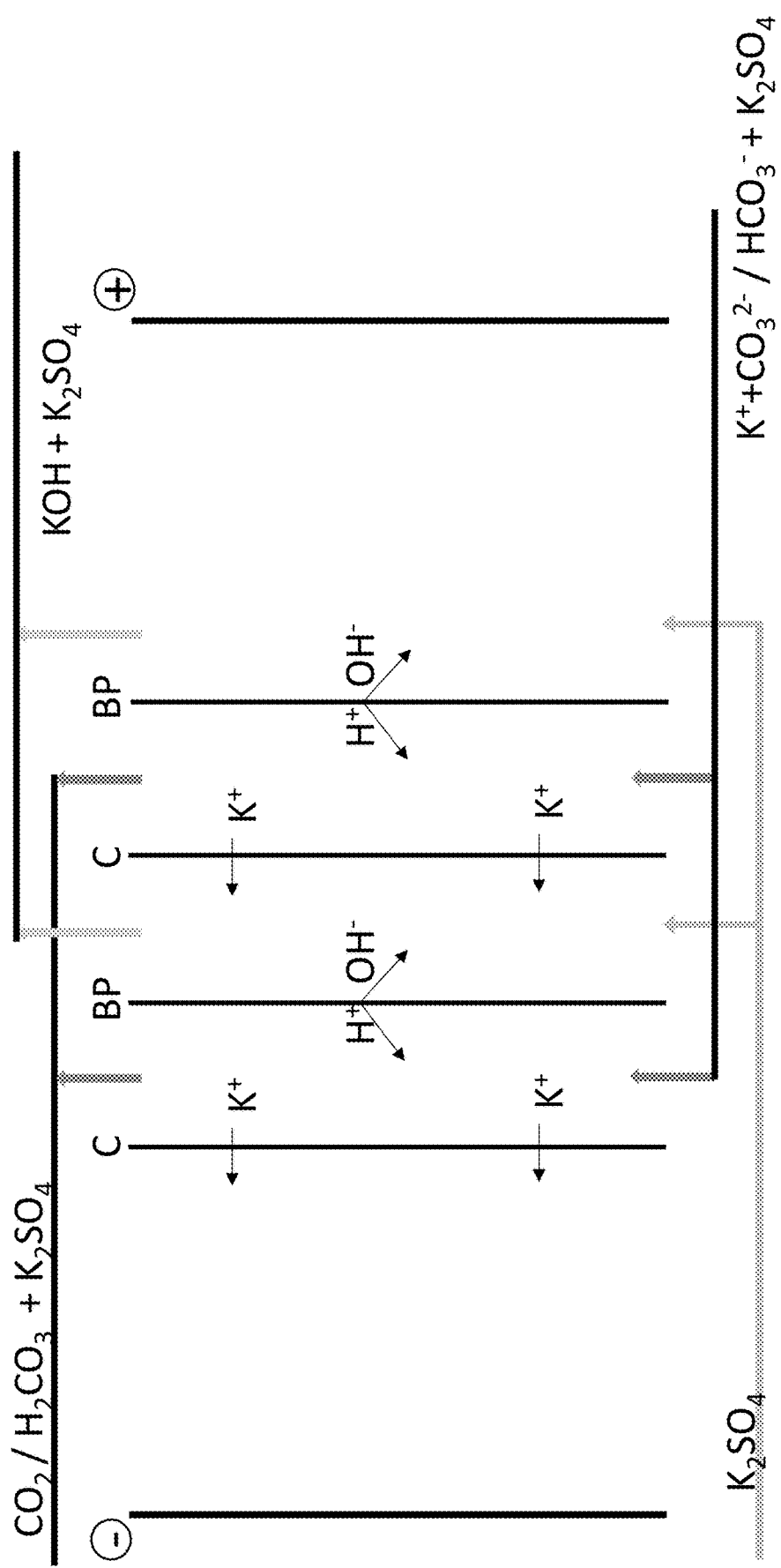
FIG. 5 schematically represents a bipolar membrane electrodialysis stack utilized in the modified salt splitter in the $CO_2$ regeneration sub-process of FIG. 4, in accordance with an embodiment of the present disclosure.

FIG. 5 schematically represents a bipolar membrane ED stack configured in accordance with an embodiment of the present disclosure. FIG. 5 also shows one example of possible flow paths through the bipolar membrane ED stack. As can be seen from FIG. 5, flow 2.b may enter every other cell in the bipolar membrane ED stack, bounded by a bipolar membrane towards the anode and a cationic membrane towards the cathode, in accordance with some embodiments. Along the path of a given cell, potassium gradually may be extracted through the cationic membrane. Also, to maintain charge neutrality, protons may enter the channel from the bipolar membrane that internally splits water once subjected to sufficient potential.

As will be appreciated in light of this disclosure, in addition to gradual depletion of potassium, the pH of the flow 2.b gradually may decrease as well. By adjusting the flow rate of flow 2.b and the electric current density of the bipolar membrane electrodialysis stack, this process may be controlled so that the pH of flow 2.b at the end (e.g., top) of each channel is such that the equilibrium state of carbon is predominantly carbonic acid/dissolved $CO_2$, in accordance with some embodiments.

Depending on the partial pressure of $CO_2$ in the bipolar membrane electrodialysis stack (e.g., total pressure), the amount of $CO_2$ that bubbles out within each cell may be controlled. In accordance with some embodiments, adjusting the temperature of flow 2.b may affect the outgassing of $CO_2$. In accordance with some embodiments, by arranging the flow of the bipolar membrane electrodialysis stack in the vertical direction with incoming feed of flow 2.b at a lower end (e.g., the bottom), gravity may transport any $CO_2$ that is outgassed in each cell in the direction of lower pH and, hence, avoid reformation of bicarbonates/carbonates.

As noted above, modified salt splitter 2.1 may include a plurality of bipolar membrane ED stacks, and flow 2.b may be passed therethrough, in accordance with some embodiments. In some such cases, between each such bipolar membrane ED stack, flow 2.b may communicate with the return or another flow of higher ionic concentration through an osmotic membrane. In accordance with some embodiments, by selectively removing water from the ion-depleting flow 2.b (e.g., via osmosis), the overall concentration may be maintained, thereby mitigating conductivity losses.

Also, as noted above, in some cases, flow 2.b may include potassium sulfate which has been added thereto. In accordance with some embodiments, the added potassium sulfate may help to supply a minimum amount of charge carriers. As (1) potassium is gradually extracted from flow 2.b and (2) bicarbonates/carbonates are gradually turned into $CO_2$ and $H_2O$ through the addition of protons, the total number of charge carriers may decrease. In turn, this may raise the resistance of the bipolar membrane ED stack and, therefore, its operating power requirements. However, because the sulfate ions may not leave a given channel, a corresponding amount of potassium may remain as well, helping to maintain charge neutrality, or if the potassium leaves, then the sulfates may turn into sulfuric acid, which may lower the pH and assist the outgassing of $CO_2$. Because sulfuric acid is a stronger acid than carbonic acid, the sulfate ions may remain in solution well below the pH as $CO_2$ bubbles out. Therefore, the addition of potassium sulfate may serve to help keep conductivity in the bipolar membrane ED stack above a certain minimum, in accordance with some embodiments. As will be appreciated in light of this disclosure, other ions (e.g., phosphates, etc.) may be added. More generally, ions which, as impurities in one or more discharge streams, may interfere only minimally with downstream process(es) may be desirable, at least in some instances.

In accordance with some embodiments, the production of hydrogen and oxygen (e.g., via electrolysis) and the production of $CO_2$ may be separate. In some such cases, the hydrogen and oxygen produced may be recombined in a fuel cell that delivers a part of the power for the $CO_2$ separation. In accordance with some embodiments, a large stack of cells may be provided, where pairs of bipolar electrodes may be replaced with bipolar membranes, where no voltage may be directly applied. As will be appreciated, the bipolar membrane may make it possible to flow a current that manifests itself (1) on the one side, in protons moving toward the anode and (2) on the other side, in hydroxide ions moving toward the cathode. The net result may be that both electric charges move away from the bipolar membrane. Thus, hydrogen and oxygen may be produced by water splitting into $H^+$ and $OH^-$ inside the membrane structure. In such a stack, a cationic membrane may be introduced between each pair of bipolar membranes and potassium carbonate may be introduced on the acidic side of the membrane. Protons may enter the acidic compartment from one bipolar membrane (e.g., the anode) and may be consumed in reactions (1) with carbonate ions forming bicarbonate ions and (2) with bicarbonate ions forming carbonic acid and $CO_2$. The electric current may be carried to the other side by potassium ions which pass through the cationic membrane to enter the alkaline side. Here, they may meet with hydroxide ions from the other bipolar membrane (e.g., the cathode side) and produce potassium hydroxide. To assure conductivity, this compartment may be primed with some hydroxide background and/or carbonate solution, if the operation aims to raise the pH of the brine, but not to the point of a pure hydroxide solution.

In accordance with some embodiments, the cationic membrane may be replaced with a porous membrane that is implemented to avoid fluid convection but is not tight enough to avoid ionic currents to flow through. In such cases, it may be desirable to maintain a net fluid flow through the pores of the membranes to avoid diffusion of carrying hydroxide ions to the anodic side. In such a configuration, solution may enter the anodic compartment and be withdrawn from the cathodic compartment. The rate of flow may be such that it effectively cancels out the hydroxide current and doubles the potassium current.

In a system that maintains the cationic membrane, water may be transferred through osmosis from the acidic (e.g., anodic) side of the cationic membrane to the basic (e.g., cathodic) side thereof. This may be possible because of removing carbonic acid (and $CO_2$) from the acid flow, which, therefore, tends toward pure water. In turn, the accumulation of potassium ions on the alkaline side may ensure that this brine is more concentrated. The concentration gradient then may support an osmotic current of water. If the cationic membranes are not sufficiently permeable to achieve water flux of a sufficient level, then it may be possible to augment the contact area with an osmotic membrane which does not allow electric charge to flow. A system that is designed in this way may minimize (or otherwise reduce) liquid withdrawal from the acidic side and essentially recover all (or substantially all) liquid from the alkaline side. However, if impurity cations have entered the system, then they may accumulate on the acidic side. Unlike $CO_2$, they may not leave in a gas phase and, unlike water and cations, they are less likely to cross through the cationic membrane. In such a design, the flow from the acidic compartment may be reduced to the point where it only (or predominantly) carries away a concentrated stream of impurity ions.

The number of bipolar membranes in the stack (and, thus, the overall stack size) may be customized, as desired for a given target application or end-use. However, as will be appreciated in light of this disclosure, the number of bipolar membranes in a stack may be practically limited, for example, given that the applied voltage grows linearly in the number of membranes in the stack. In accordance with some embodiments, each stack may start and end with a gas-generating electrode. In accordance with some embodiments, after the cathode, there may be a plurality of bipolar membranes, each acting as an electrode pair that short-circuits the production of $H_2$ and $O_2$. In accordance with some embodiments, the stack may be made very short and, in the limit that all bipolar membranes may be removed, such a stack may produce hydrogen and oxygen in every cell.

Modified salt splitter 2.1 may be configured to output a flow 2.*c*. The chemical composition of flow 2.*c* may depend, at least in part, on one or more factors, including current density, current efficiency, and the effective flow speed through modified salt splitter 2.1. In accordance with some embodiments, all cations (except protons) other than those balancing the inert anions may have been removed from flow 2.*b* via modified salt splitter 2.1, resulting in flow 2.*c*. Flow 2.*c* may be of a pH in the range of about 3-7. In some cases, this pH range may facilitate bubbling out of $CO_2$ from flow 2.*c* (e.g., in $CO_2$ outgassing chamber 2.3, discussed below).

As can be seen further from FIG. 4, the $CO_2$ regeneration sub-process 200 may involve a $CO_2$ outgassing chamber 2.3. $CO_2$ outgassing chamber 2.3 may be configured to receive flow 2.*c* and to allow $CO_2$ (and, optionally, hydrogen that was generated at the cathode of modified salt splitter 2.1) to bubble out from flow 2.*c* into its headspace. As will be appreciated in light of this disclosure, the outgassing process within $CO_2$ outgassing chamber 2.3 may rely on the relatively slow kinetic of $CO_2$ outgassing. The outgassing of $CO_2$ may be controlled by maintaining a lower partial pressure of $CO_2$ above flow 2.*c* (e.g., lower than the equilibrium through Henry's law stipulate). In accordance with some embodiments, $CO_2$ may be outgassed at an elevated pressure. More generally, with system 1000, the $CO_2$ generally may be retained in solution (e.g., in flow 2.*c*) until after it has exited modified salt splitter 2.1 to be outgassed (e.g., in $CO_2$ outgassing chamber 2.3), in accordance with some embodiments.

In some embodiments, $CO_2$ outgassing chamber 2.3 may include a microchannel membrane assembly or hollow fiber bundle allowing for flow 2.*c* to be transported on one side (e.g., the lumen side) and a separate carrier gas on the other side (e.g., the shell side). The atmosphere of the shell side may be predominantly $CO_2$. In accordance with some embodiments, a sweep gas (e.g., hydrogen) may be transferred to the shell side. In such cases, the pressure regulation may depend, at least in part, on the partial pressure of $CO_2$ rather than the total pressure (e.g., which may be essentially the same as if only $CO_2$ were present on the shell side).

In some embodiments, $CO_2$ outgassing chamber 2.3 may include a gas flow valve in communication with its headspace. The gas flow valve may be configured, in accordance with some embodiments, to open at a pressure, for example, marginally lower than the operating pressure of modified salt splitter 2.1. In some cases, pressure reduction on the liquid side may be provided as well, for instance, to keep the liquid at bay.

In some embodiments, $CO_2$ outgassing chamber 2.3 may include a pressure regulating valve configured to reduce the pressure of incoming flow 2.*c* (e.g., to a pressure lower than the operating pressure of modified salt splitter 2.1). In some such cases, this may facilitate the bubbling out of $CO_2$ from flow 2.*c*. In some embodiments, rather than a pressure regulating valve, $CO_2$ outgassing chamber 2.3 may include an isobaric flow valve configured to prevent (or otherwise reduce) the build-up of pressure of incoming flow 2.*c*. In some such cases, the incoming flow 2.*c* may force gas(es) out from the headspace at approximately the same pressure.

$CO_2$ outgassing chamber 2.3 may be configured to output a flow 2.*e*. Flow 2.*e* may be (or otherwise may include) a mixture including $CO_2$ (e.g., more than 95% by weight) and water (e.g., less than 5% by weight). $CO_2$ outgassing chamber 2.3 also may be configured to output a flow 2.*d*. With the majority of $CO_2$ outgassed from flow 2.*c* in $CO_2$ outgassing chamber 2.3, the resultant flow 2.*d* may be routed back through modified salt splitter 2.1 (e.g., as flow 2.*f*, downstream of pump 2.6, each discussed below).

As can be seen further from FIG. 4, the gas capture sub-process 100 of system 1000 may involve a pump 2.6. Pump 2.6 may be configured to receive flow 2.*d*, elevate its pressure, and output a flow 2.*f*. In accordance with some embodiments, pump 2.6 may be configured to elevate the pressure of flow 2.*d* to be about equal to the operating pressure of modified salt splitter 2.1. If the outgassing of $CO_2$ within $CO_2$ outgassing chamber 2.3 is done approximately isobarically with modified salt splitter 2.1, however, then the pressure of flow 2.*d* may be only marginally lower than that of the operating pressure of modified salt splitter 2.1. Thus, in some such cases, pump 2.6 may be omitted, and a diaphragm instead may be in contact with flow 2.*d*.

Modified salt splitter 2.1 may receive flow 2.*f*. Within modified salt splitter 2.1, flow 2.*f* may experience an influx of (1) potassium ions from the cationic membranes and (2) hydroxide ions from the bipolar membrane. Consequently, the pH of flow 2.*f* may increase gradually.

Modified salt splitter 2.1 also may be configured to output a flow 2.*g*. In accordance with some embodiments, flow 2.*g* may be (or otherwise may include) an alkaline solution (e.g., outbound from the bipolar membrane ED stack of modified salt splitter 2.1). Flow 2.*g* may be passed to a reservoir 2.4 (discussed below).

As can be seen further from FIG. 4, the $CO_2$ regeneration sub-process 200 may involve a reservoir 2.4 configured to store flow 2.*g*. In some embodiments, reservoir 2.4 may be equipped with one or more flow valves configured to control the flow of flow 2.*g* away from modified salt splitter 2.1 (e.g., if modified salt splitter 2.1 is operated at pressure). In some embodiments, reservoir 2.4 may include a gas flow valve configured to vent gas(es) (e.g., oxygen) produced inside modified salt splitter 2.1.

Reservoir 2.4 may be configured to output a flow 2.*h*. In accordance with some embodiments, flow 2.*h* may be (or otherwise may include) an alkaline aqueous solution (e.g., outbound from the bipolar membrane ED stack of modified salt splitter 2.1). In accordance with some other embodiments, flow 2.*h* may be (or otherwise may include) a solid or semi-solid substrate-based sorbent with active sites for $CO_2$ uptake. In some cases, flow 2.*h* may be provided to a pump 2.7 (discussed below).

As can be seen further from FIG. 4, the $CO_2$ regeneration sub-process 200 may involve a pump 2.7. Pump 2.7 may be configured to receive flow 2.*h*, elevate its pressure, and output a flow 2.*i* (discussed below). In some cases, if reservoir 2.4 is at an elevated pressure, then pump 2.7 may be omitted, and a flow control valve (e.g., in reservoir 2.4) may be utilized instead.

Pump 2.7 may be configured to output a flow 2.*i*. In accordance with some embodiments, flow 2.*i* may be (or otherwise may include) potassium hydroxide, possibly with potassium sulfate or other salts. Flow 2.*i* may be provided for use elsewhere in system 1000 (e.g., for additional $CO_2$ uptake in the gas capture sub-process 100 thereof) or otherwise.

As will be appreciated in light of this disclosure, within modified salt splitter 2.1, there may be evolution of hydrogen gas by the cathode and oxygen gas by the anode. Normally in electrodialysis, it may be desirable to use separate catholyte and anolyte rinse streams to keep process gases from entering the feed/return solutions. However, with system 1000, the $CO_2$ (e.g., obtained from the gas capture sub-process 100 and $CO_2$ regeneration sub-process 200) eventually may be mixed with hydrogen (e.g., generated from the hydrogen generation sub-process 300, discussed below) in producing a liquid fuel, in accordance with some embodiments. Thus, retaining (1) the hydrogen produced at the cathode of modified salt splitter 2.1 with (2) the $CO_2$ output thereof may be advantageous to system 1000 in producing the liquid fuel, in accordance with some embodiments. Therefore, rather than using a separate catholyte rinse solution, flow 2.*b* may be circulated alongside the catholyte as well, in accordance with some embodiments. Similarly, because the outgoing return stream of flow 2.*h*/2.*i* may be transported to the gas capture sub-process 100, the anolyte rinse stream may be replaced therewith, in accordance with some embodiments. Of course, if it is desirable instead to keep the produced hydrogen and $CO_2$ gases separate, then catholyte/anolyte circulation streams that are different and separate from the feed and return streams may be utilized, in accordance with some embodiments. As will be appreciated in light of this disclosure, it may be desirable, at least in some instances, to ensure that the $CO_2$ and oxygen are not mixed.

As will be further appreciated in light of this disclosure, it may be desirable, at least in some instances, to operate the $CO_2$ regeneration sub-process 200 at elevated pressure, in accordance with some embodiments. In turn, this may allow for omission of $CO_2$ gas compressor(s) in system 1000, though in at least some cases, such element(s) optionally may be included.

Hydrogen Generation Sub-Process:

As noted above, system 1000 also may include a hydrogen generation sub-process 300 through which hydrogen may be generated for use in producing a liquid fuel output. Hydrogen may be produced by splitting water through any one (or combination) of electrolytic, thermal, and chemical means. As will be appreciated in light of this disclosure, in at least some cases, an electrochemical approach may be operated (e.g., turned on and off) in increments on the order of seconds. As will be further appreciated, the transition may be measured in seconds, at least in some instances.

Figure 6:
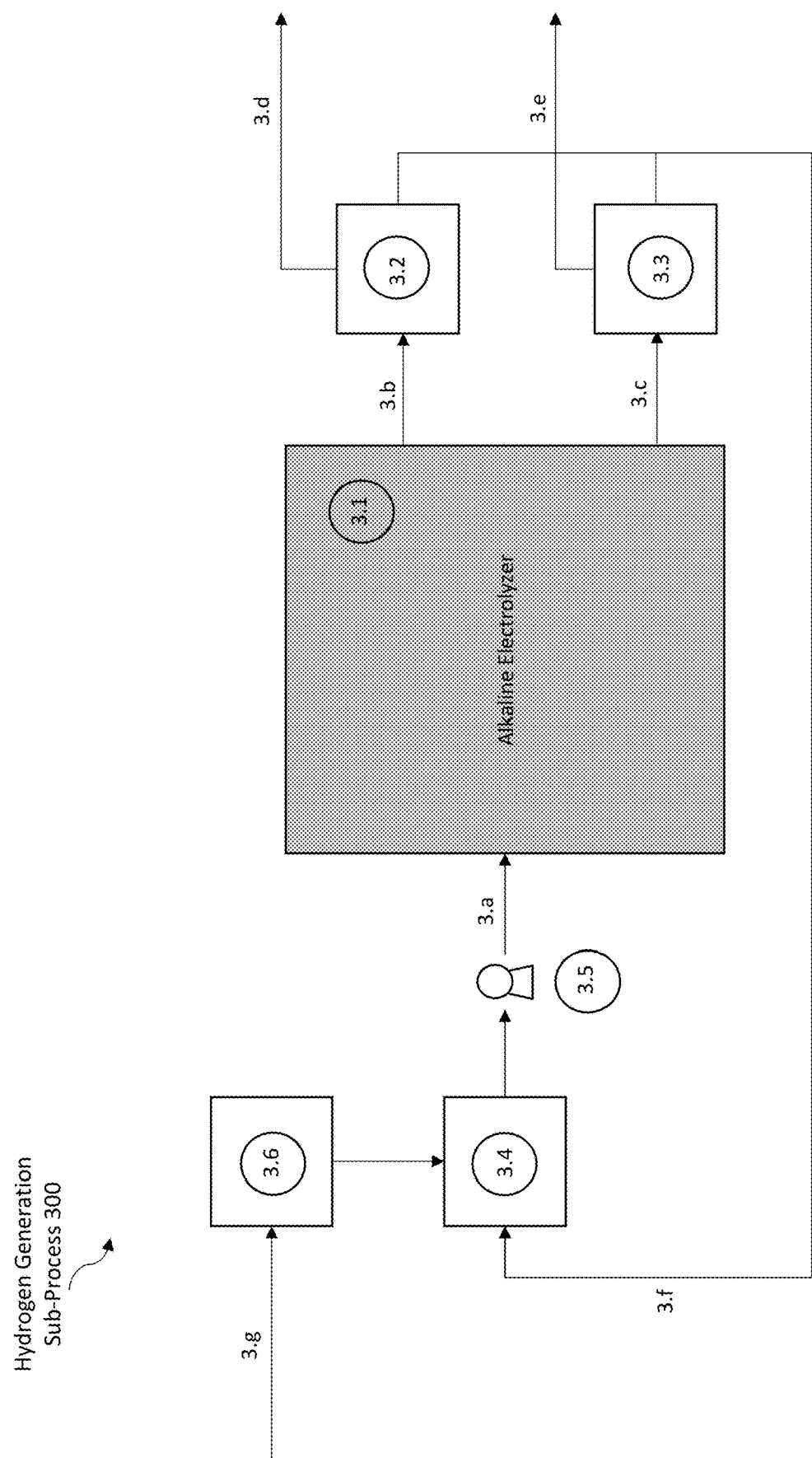
FIG. 6 is a block diagram illustrating an example hydrogen generation sub-process of the fuel production system of FIG. 1, in accordance with an embodiment of the present disclosure.

FIG. 6 is a block diagram illustrating an example hydrogen generation sub-process 300 of system 1000, in accordance with an embodiment of the present disclosure. As can be seen, the hydrogen generation sub-process 300 may involve producing hydrogen through alkaline electrolysis of the input water received by system 1000. In some such cases, the hydrogen generation sub-process 300 may output: (1) a hydrogen product stream (e.g., including >95% by weight $H_2$, possibly at elevated pressure); and (2) an oxygen stream (e.g., in the form of either $O_2$, possibly at elevated pressure, or an oxide).

As can be seen from FIG. 6, a flow 3.*a* may be received by the hydrogen generation sub-process 300. In accordance with some embodiments, flow 3.*a* may be (or otherwise may include) a potassium hydroxide (KOH) solution. In some such cases, flow 3.*a* may have a KOH concentration, for example, in the range of about 1-40% (e.g., about 1-10%, about 10-20%, about 20-30%, about 30-40%, or any other sub-range in the range of about 1-40%).

As can be seen further from FIG. 6, the hydrogen generation sub-process 300 also may involve an alkaline electrolyzer 3.1. In accordance with some embodiments, alkaline electrolyzer 3.1 may be configured to provide water electrolysis via a proton exchange membrane (PEM) cell. As will be appreciated, this approach may have a high electrical efficiency. In accordance with some embodiments, each cathode/anode pair of alkaline electrolyzer 3.1 may be separated by an anionic exchange membrane, a porous membrane, or other physical flow guide that prevents (or otherwise reduces) convective mass flow across the boundary but allows for charge transfer of the same.

In accordance with some embodiments, alkaline electrolyzer 3.1 may be configured to utilize an electrolyte including, for example, potassium hydroxide (KOH), sodium hydroxide (NaOH), carbonate, bicarbonate, and/or a sulfate, to name a few options. In some cases, the electrolyte may be (or otherwise may include) sodium hydroxide (NaOH), sodium carbonate ($Na_2CO_3$), and/or a phosphate, among others. As will be further appreciated in light of this disclosure, if the electrolyte remains stagnant in alkaline electrolyzer 3.1, then gases eventually may saturate the electrolyte. As such, if the electrolyte instead is circulated and outgassed (partially or completely) outside of alkaline electrolyzer 3.1, then bubble formation may be prevented (or otherwise reduced) therein, in accordance with some embodiments.

In some embodiments, alkaline electrolyzer 3.1 may include nickel-based electrodes (e.g., for an alkaline electrolyte). In some cases, the total cathode area in alkaline electrolyzer 3.1 may be, for example, in the range of about 0.1-5 $m^2$ (e.g., about 0.1-1 $m^2$, about 1-2.5 $m^2$, about 2.5-5 $m^2$, or any other sub-range in the range of about 0.1-5 $m^2$). In some cases, alkaline electrolyzer 3.1 may be operated at a current density, for example, in the range of about 0-1 $A/cm^2$ (0-0.5 $A/cm^2$, 0.5-1 $A/cm^2$, or any other sub-range in the range of about 0-1 $A/cm^2$). It should be noted that, at least in some cases, the electrolyte in alkaline electrolyzer 3.1 may experience a pH gradient, having a low pH around the cathode, and/or that a small anode compartment which is acidic may be provided even if the remainder of the cell is alkaline, in accordance with some embodiments. As such, alkaline electrolyzer 3.1 optionally may include a precious metal anode in some embodiments. As will be appreciated, this may help to ensure material stability, for instance, in a highly acidic anode environment.

As will be appreciated in light of this disclosure, the operating pressure of alkaline electrolyzer 3.1 may depend, at least in part, on exit valve(s) provided for flows 3.*b* and 3.c (each discussed below). In accordance with some embodiments, the total operating pressure of alkaline electrolyzer 3.1 may be in the range of about 1-60 bar (e.g., about 1-20 bar, about 20-40 bar, about 40-60 bar, or any other sub-range in the range of about 1-60 bar).

In accordance with some embodiments, alkaline electrolyzer 3.1 may be configured to output a flow 3.b and a flow 3.c. Flow 3.b may be, for example, a catholyte output stream including the electrolyte and dissolved and/or entrained hydrogen gas, in accordance with some embodiments. Flow 3.c may be, for example, an anolyte output stream including the electrolyte and dissolved and/or entrained oxygen gas, in accordance with some embodiments.

As can be seen further from FIG. 6, the hydrogen generation sub-process 300 may involve a catholyte outgassing chamber 3.2. In accordance with some embodiments, catholyte outgassing chamber 3.2 may be configured to receive flow 3.b and to outgas the electrolyte thereof which has circulated through alkaline electrolyzer 3.1. To that end, catholyte outgassing chamber 3.2 may include a semi-permeable membrane configured for outgassing of a liquid, in accordance with some embodiments. In at least some cases, the semi-permeable membrane may be configured to separate the outgassing liquid from the gas phase. In accordance with some embodiments, catholyte outgassing chamber 3.2 may be divided into two or more chambers where the outgassing pressure may be progressively lowered. In at least some cases, this may help to evacuate more hydrogen from the electrolyte before it is recirculated.

In accordance with some embodiments, catholyte outgassing chamber 3.2 may be configured to have a sweep gas (e.g., steam) introduced therein. In at least some cases, the sweep gas may allow for a greater difference in partial pressure of the hydrogen in solution and in the gas phase above the solution. In turn, this may increase the driving force for outgassing within catholyte outgassing chamber 3.2, in accordance with some embodiments.

In some embodiments, catholyte outgassing chamber 3.2 may have a headspace which is in communication with a gas relief valve. In some such cases, the gas relief valve may be set at a pressure, for example, that is slightly lower than the operating pressure of alkaline electrolyzer 3.1. In accordance with some embodiments, the gas expelled from the electrolyte (e.g., predominantly hydrogen) may be vented from catholyte outgassing chamber 3.2 via the gas relief valve at approximately the same pressure.

In some embodiments, catholyte outgassing chamber 3.2 may include a liquid release valve. In some such cases, the liquid release valve may be set at a pressure, for example, that is lower than the operating pressure of alkaline electrolyzer 3.1. In accordance with some embodiments, the liquid electrolyte (e.g., flow 3.f, discussed below) may be passed from catholyte outgassing chamber 3.2 via the liquid release valve.

In some embodiments, catholyte outgassing chamber 3.2 may include a pressure regulator. In some such cases, the pressure regulator may be configured to step down the pressure of incoming flow 3.b. For example, in some instances, the pressure may be stepped down by an amount in the range of about 1-60 bar (e.g., about 1-20 bar, about 20-40 bar, about 40-60 bar, or any other sub-range in the range of about 1-60 bar).

In accordance with some embodiments, a flow valve may be installed between alkaline electrolyzer 3.1 and catholyte outgassing chamber 3.2. In some such cases, the flow valve, when opened, may serve to (1) push out hydrogen gas that has accumulated in the headspace of catholyte outgassing chamber 3.2 (e.g., into flow 3.d, discussed below) and/or (2) expel the outgassed electrolyte (e.g., into flow 3.f, discussed below).

In accordance with some embodiments, catholyte outgassing chamber 3.2 may be configured to output a flow 3.d. Flow 3.d may be (or otherwise may include) a hydrogen output stream coming from catholyte outgassing chamber 3.2. If no sweep gas has been introduced into catholyte outgassing chamber 3.2 (as discussed above), then flow 3.d may include predominantly hydrogen with a minor water component (e.g., steam). However, if a sweep gas has been so introduced, then flow 3.d may include hydrogen diluted with that sweep gas.

As can be seen further from FIG. 6, the hydrogen generation sub-process 300 may involve an anolyte outgassing chamber 3.3. In accordance with some embodiments, anolyte outgassing chamber 3.3 may be configured to receive flow 3.c and to outgas the electrolyte thereof which has circulated through alkaline electrolyzer 3.1. As will be appreciated in light of this disclosure, the description provided above with respect to the various possible configurations and operation of catholyte outgassing chamber 3.2 may apply equally here with respect to anolyte outgassing chamber 3.3, in accordance with some embodiments.

In accordance with some embodiments, anolyte outgassing chamber 3.3 may be configured to output a flow 3.e. Flow 3.e may be (or otherwise may include) an oxygen output stream coming from anolyte outgassing chamber 3.3. If no sweep gas has been introduced into anolyte outgassing chamber 3.3 (as discussed above), then oxygen output stream 3.e may include predominantly oxygen with a minor water component (e.g., steam). However, if a sweep gas has been so introduced, then flow 3.e may include oxygen diluted with that sweep gas.

In accordance with some embodiments, catholyte outgassing chamber 3.2 and/or anolyte outgassing chamber 3.3 further may be configured to output to flow 3.f. In some cases, flow 3.f may be (or otherwise may include) outgassed electrolyte (e.g., coming from catholyte outgassing chamber 3.2 and/or anolyte outgassing chamber 3.3) which has circulated through alkaline electrolyzer 3.1. In some instances, the de-gassed electrolyte in flow 3.f may be expelled from catholyte outgassing chamber 3.2 and/or anolyte outgassing chamber 3.3 at a pressure in the range of about 1-60 bar (e.g., about 1-20 bar, about 20-40 bar, about 40-60 bar, or any other sub-range in the range of about 1-60 bar). In some cases, flow 3.f may include minor amounts of hydrogen (e.g., left behind in catholyte outgassing chamber 3.2) and/or oxygen (e.g., left behind in anolyte outgassing chamber 3.3).

As can be seen further from FIG. 6, the hydrogen generation sub-process 300 may involve an electrolyte holding chamber 3.4. In some embodiments, electrolyte holding chamber 3.4 may be configured to hold the electrolyte of flow 3.f prior to it being introduced back into alkaline electrolyzer 3.1. In some embodiments, electrolyte holding chamber 3.4 may be equipped with a heater configured, for example, to supply alkaline electrolyzer 3.1 with electrolyte at an elevated temperature. In some such cases, the electrolyte temperature may be in the range of about 0-90° C. (e.g., about 0-30° C., about 30-60° C., about 60-90° C., or any other sub-range in the range of about 0-90° C.).

Also, as can be seen from FIG. 6, the hydrogen generation sub-process 300 may involve a pump 3.5. In some embodiments, pump 3.5 may be configured to ensure sufficient flow of flow 3.a through alkaline electrolyzer 3.1. In at least some cases, pump 3.5 may be configured to work against the pressure set by exit valve flow regulator(s) in alkaline electrolyzer 3.1.

As can be seen further from FIG. 6, the hydrogen generation sub-process 300 may involve a reservoir 3.6. In accordance with some embodiments, reservoir 3.6 may be configured to hold make-up water for the electrolyte of alkaline electrolyzer 3.1. In accordance with some embodiments, reservoir 3.6 may be configured to be in flow communication with electrolyte holding chamber 3.4. In some embodiments, reservoir 3.6 may be configured to ensure a minimum (or other target) amount of electrolyte is maintained in electrolyte holding chamber 3.4.

In accordance with some embodiments, reservoir 3.6 may be configured to receive a flow 3.*g*. Flow 3.*g* may be (or otherwise may include) make-up water for the electrolyte in electrolyte holding chamber 3.4, in accordance with some embodiments. In accordance with some embodiments, flow 3.*g* may be provided, in part or in whole, from the optional water pre-treatment sub-process 500 (discussed below) of system 1000.

As will be appreciated in light of this disclosure, it may be desirable, at least in some instances, to operate the hydrogen generation sub-process 300 at elevated pressure, in accordance with some embodiments. In turn, this may allow for omission of hydrogen gas compressor(s) in system 1000, though in at least some cases, such element(s) optionally may be included.

As primarily discussed herein, water electrolysis may be the main source of hydrogen for system 1000, in accordance with some embodiments. However, in accordance with some other embodiments, system 1000 further may include one or more interim or auxiliary hydrogen generation means. For example, as discussed herein, the fuel synthesis sub-process 400 (discussed below) may involve reacting hydrogen and $CO_2$ to form methanol. Optionally, the produced methanol may be stored for an interim period. Also, as discussed herein, system 1000 further may have access to an aqueous solution of potassium hydroxide (KOH). Thus, and in accordance with some embodiments, the stored methanol may be heated together with the KOH to generate hydrogen according to the following reaction:

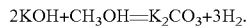

$$2KOH + CH_3OH = K_2CO_3 + 3H_2.$$

In accordance with some embodiments, the potassium carbonate ($K_2CO_3$) produced here may be fed back into the carbonate-bearing stream. In accordance with some embodiments, the hydrogen may be used in the downstream fuel synthesis sub-process 400 (discussed below) even when system 1000 is not engaged in water electrolysis to produce hydrogen.

Optional Water Pre-Treatment Sub-Process:

As discussed herein, system 1000 may be configured to utilize input water from any one (or combination) of a wide range of water sources. For example, in some embodiments, system 1000 may be configured to utilize input water from a fixed or dedicated water source, such as city water or well water. In some embodiments, system 1000 may be configured to utilize input water, for example, from an intermittent or collected water source, such as rainwater or a water vapor byproduct of the gas capture sub-process 100 of system 1000.

As will be appreciated, some input water sources (e.g., city water, well water, rainwater, etc.) may be sufficiently clean as-is to achieve a given target operation of system 1000. Other input water sources, however, may not be, as they may contain impurities that could have a deleterious effect on material and/or processes (e.g., electrochemical processes) downstream in system 1000. Examples may include macroscopic impurities (e.g., biologic and colloidal media) and salts (e.g., chlorides commonly found in potable water sources), among others. As such, it may be desirable, at least in some instances, to clean up the input water before it enters system 1000 and/or to utilize continuous cleanup during operation of system 1000.

Thus, in accordance with some embodiments, system 1000 optionally may include a water pre-treatment sub-process 500. The water pre-treatment sub-process 500 may include one or more input water cleanup stages that generally serve to purify the input water for system 1000. For example, the input water may undergo any one (or combination) of screening, distillation, ion exchange, forward osmosis, reverse osmosis, and precipitation of solids, to name a few options. In at least some cases, such upstream efforts may help to prevent (or otherwise reduce) the accumulation of salts and other impurities from downstream recirculating of water in system 1000. As will be further appreciated, there may be several thermal flows from various sub-processes of system 1000 that may be used to drive pre-treatment (e.g., distillation), in whole or in part, in accordance with some embodiments. In accordance with some embodiments, pre-treated input water optionally may be stored before delivery to or use by a given downstream portion of system 1000.

In accordance with some embodiments, a plurality of input water pre-treatment techniques may be employed. In some cases, pre-treatment may be applied individually, simultaneously, serially, and/or in parallel. In some cases, pre-treatment of the input water may be provided in a continuous fashion. As will be appreciated in light of this disclosure, it may be desirable, at least in some instances, to utilize continuous cleanup of the input water even if system 1000 does not consume water or is a net water collector. In accordance with some embodiments, the input water may be cleaned to a degree much higher than operational specifications of system 1000.

In accordance with some embodiments, system 1000 may be configured to remove impurity ions from the input water via ion exchange and/or one or more membranes. To that end, the water pre-treatment sub-process 500 may involve, for example, one or more ion exchange beds or columns, in accordance with some embodiments. In at least some cases, system 1000 may be configured to generate enough base and acid to regenerate the ion exchange beds/columns. In an example case, the ion exchange media may be regenerated (1) against carbonic acid for cations (e.g., protons) and (2) against carbonic acid or carbonate/bicarbonate brines for the anion exchange. In some cases, anions in the water may be exchanged, for instance, for carbonate/bicarbonate ions. In some cases, cations in the water may be exchanged, for instance, for protons using an acid (e.g., carbonic acid). In some cases, carbonic acid produced by system 1000 may be utilized in exchanging (1) impurity cations against protons and (2) impurity anions against carbonate/bicarbonate ions.

Figure 7:
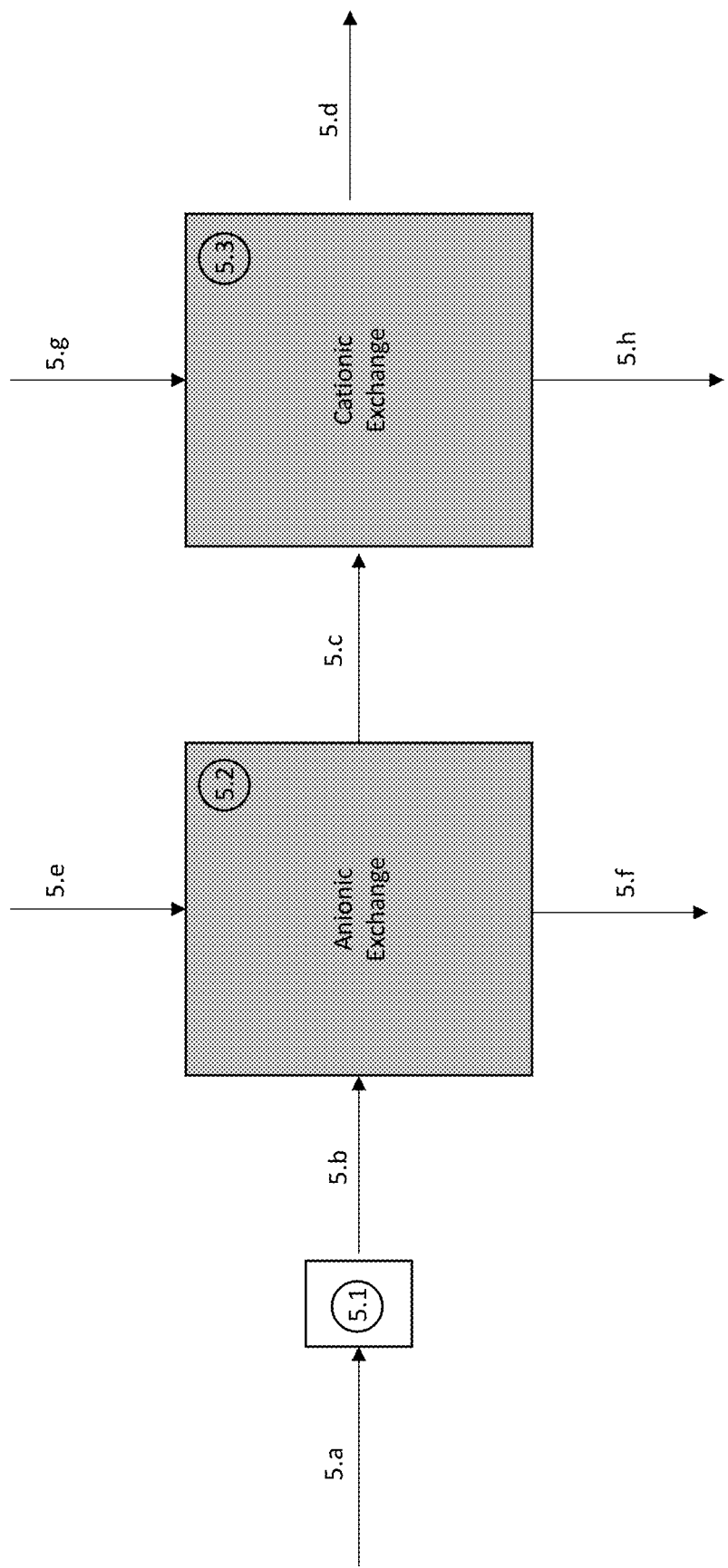
FIG. 7 is a block diagram illustrating an example water pre-treatment sub-process optionally implemented upstream of the hydrogen generation sub-process of FIG. 6, in accordance with an embodiment of the present disclosure.

FIG. 7 is a block diagram illustrating an example water pre-treatment sub-process 500 of system 1000, in accordance with an embodiment of the present disclosure. As can be seen, a flow 5.*a* may be received by the water pre-treatment sub-process 500. Flow 5.*a* may be (or otherwise may include) a volume of input water sourced from one or more sources, as discussed above.

As can be seen further from FIG. 7, the water pre-treatment sub-process 500 may involve a screening (e.g., mechanical filter) and/or pressurization stage 5.1. In some cases, a single screen may be utilized, whereas in some other cases, a plurality of different screens may be utilized. The fineness of a given screen may be in the range of about 0.1 µm to several hundreds of microns, as desired for a given target application or end-use. In some cases, a pump may be utilized to pressurize the feed of the input water.

The screening and/or pressurization stage 5.1 may be configured to output a flow 5.b. Flow 5.b may be (or otherwise may include) a solution of substantially the same chemical composition (e.g., primarily water) as flow 5.a. However, as compared to flow 5.a, flow 5.b may be of a lesser impurity level by virtue of the screening provided.

As can be seen further from FIG. 7, the water pre-treatment sub-process 500 may involve an anionic exchange vessel 5.2. In accordance with some embodiments, anionic exchange vessel 5.2 may include one or more media (e.g., a resin, a substrate, etc.) that contain active sites allowing for the exchange of anionic species with the incoming feed of flow 5.b.

Anionic exchange vessel 5.2 may be configured to output a flow 5.c. Flow 5.c may be (or otherwise may include) a solution of substantially the same chemical composition (e.g., primarily water) as flow 5.b. However, as compared to flow 5.b, flow 5.c may be of a lesser impurity level by virtue of the anionic exchange provided.

In accordance with some embodiments, anionic exchange vessel 5.2 may be configured to undergo regeneration of its anionic solution. To that end, anionic exchange vessel 5.2 may be flushed with a flow 5.e. In accordance with some embodiments, flow 5.e may be (or otherwise may include) a solution of carbonate/bicarbonate ions (e.g., available to system 1000). Such flushing of anionic exchange vessel 5.2 may be provided intermittently (e.g., when the anionic exchange resins or substrates are nearly fully loaded) or continuously, as desired. As will be appreciated, this may help to replace the trapped anionic impurities with carbonates/bicarbonates. In turn, the anionic impurities may migrate to flow 5.f for disposal, in accordance with some embodiments.

Also, as can be seen from FIG. 7, the water pre-treatment sub-process 500 may involve a cationic exchange vessel 5.3. In accordance with some embodiments, cationic exchange vessel 5.3 may include one or more media (e.g., a resin, a substrate, etc.) that contain active sites allowing for the exchange of cationic species with the incoming feed of flow 5.c.

Cationic exchange vessel 5.3 may be configured to output a flow 5.d. Flow 5.d may be (or otherwise may include) a solution of substantially the same chemical composition (e.g., primarily water) as flow 5.c. However, as compared to flow 5.c, flow 5.d may be of a lesser impurity level by virtue of the cationic exchange provided.

In accordance with some embodiments, cationic exchange vessel 5.3 may be configured to undergo regeneration of its cationic solution. To that end, cationic exchange vessel 5.3 may be flushed with a flow 5.g. In accordance with some embodiments, flow 5.g may be (or otherwise may include) a solution of carbonic acid (e.g., available to system 1000). Such flushing of cationic exchange vessel 5.3 may be provided intermittently (e.g., when the cationic exchange resins or substrates are nearly fully loaded) or otherwise periodically, as desired. As will be appreciated, this may help to replace the trapped cationic impurities with protons from the carbonic acid. In turn, the cationic impurities may migrate to flow 5.h for disposal, in accordance with some embodiments.

Optional Produced/Recirculated Water Treatment Sub-Process:

As will be further appreciated in light of this disclosure, system 1000 may pick up impurities from sources other than the input water. For example, the ambient air may contain sour gases other than $CO_2$, such as sulfur dioxide ($SO_2$), which may enter system 1000 (e.g., at the gas capture sub-process 100). In some instances, $SO_2$ may not be freed from the sorbent during the $CO_2$ regeneration sub-process 200 and, thus, may tend to accumulate in system 1000. Also, if the gas capture sub-process 100 of system 1000 continuously loses water to evaporation, then the salt concentration in the remaining solution may increase over time.

Thus, in accordance with some embodiments, system 1000 may be configured to clean the produced/recirculating water therein. In some cases, the produced/recirculating water may be treated in a continuous fashion. As will be appreciated in light of this disclosure, it may be desirable, at least in some instances, to utilize continuous cleanup of the produced/recirculating water even if system 1000 does not consume water or is a net water collector.

In accordance with some embodiments, system 1000 may be configured to remove impurity ions from the produced/recirculating water via ion exchange. As will be appreciated in light of this disclosure, any of the same techniques discussed above, for example, with respect to removing impurity ions from the input water via ion exchange may be utilized here in the context of the produced/recirculating water, in accordance with some embodiments.

In accordance with some embodiments, system 1000 may be configured to precipitate out salts to lower their concentration in the solution. In at least some cases, this may reduce calcium ion concentrations. In some cases, alkali ions and chloride ions (e.g., silver chloride) may be precipitated out utilizing one or more reagents.

In accordance with some embodiments, system 1000 may be configured to utilize forward and/or reverse osmosis, for instance, to concentrate brines prior to disposal. For forward osmosis, it may be desirable, at least in some cases, to utilize salts (e.g., ammonium bicarbonate) where both ions can be removed from the solution through heat treatment.

As will be appreciated in light of this disclosure, in some cases, anions may be kept behind in modified salt splitter 2.1 of the $CO_2$ regeneration sub-process 200 (discussed above). Thus, in accordance with some embodiments, the exit for water from the acidic side may be throttled down to the point that it removes unwanted anions that stay behind in acid form as an acidic brine. This acidic brine may be neutralized, for example, against precipitated carbonates, thereby recovering $CO_2$, in accordance with some embodiments. In some cases, carbonic acid may be used in an ion exchange column to remove excess alkali from the alkaline side of the acidic brine.

In accordance with some embodiments, system 1000 may include one or more ion exchange columns configured to remove unwanted ionic species from the input water and/or produced/recirculating water. As will be appreciated in light of this disclosure, carbonic acid may be available in abundance in system 1000. Therefore, in accordance with some embodiments, (1) protons may be utilized as cations and (2) bicarbonate or carbonate ions may be utilized as anions in the ion exchange column(s). At the end of the ion exchange process, however, the ion exchange column(s) may be filled with the selectively removed ions and so either may be regenerated on site or, if of cartridge form, may be replaced. If a given exchange column is operated at pressure (e.g., at about 30 bar), then the fluid therein may be exposed, for instance, to an approximately 1-molar solution capable of performing ion exchange. As will be further appreciated, the specific molarity may depend, at least in part, on the operating pressure.

Fuel Synthesis Sub-Process:

As noted above, system 1000 also may include a fuel synthesis sub-process 400 though which $CO_2$ and hydrogen may be combined to produce a liquid fuel output. In accordance with some embodiments, the $CO_2$ and hydrogen may be reacted and condensed into methanol and water. Once methanol is available, one or more methanol-to-gasoline (MTG) processes may be utilized to go from methanol to a gasoline product and/or a gasoline blend stock. For instance, in accordance with some embodiments, the produced methanol may be fed directly into a zeolite-based reactor that dehydrates the methanol and homologates the carbon into longer carbon chains and aromatic compounds. In accordance with some embodiments, the produced methanol may be subjected to a preliminary dehydration step, resulting in dimethyl ether (DME) and water. In turn, the water may be separated ahead of the zeolite-based reactor to reduce the moisture content inside. As will be appreciated, this may be beneficial, at least in some instances, for catalyst stability and reaction selectivity, as well as overall process control.

In accordance with some embodiments, the fuel synthesis sub-process 400 may be configured such that it does not involve any compressors or other devices that actively (e.g., with a separate energy input) raise the pressure of any gas stream. Rather, in accordance with some embodiments, the fuel synthesis sub-process 400 may rely completely (or at least predominantly) on the elevated pressure of the input gases $CO_2$ and hydrogen produced upstream. In accordance with some embodiments, the fuel synthesis sub-process 400 may be configured to hold a minimum of compressed gases at any given point, generally enhancing safety aspects (e.g., in case of material failure).

Figure 8:
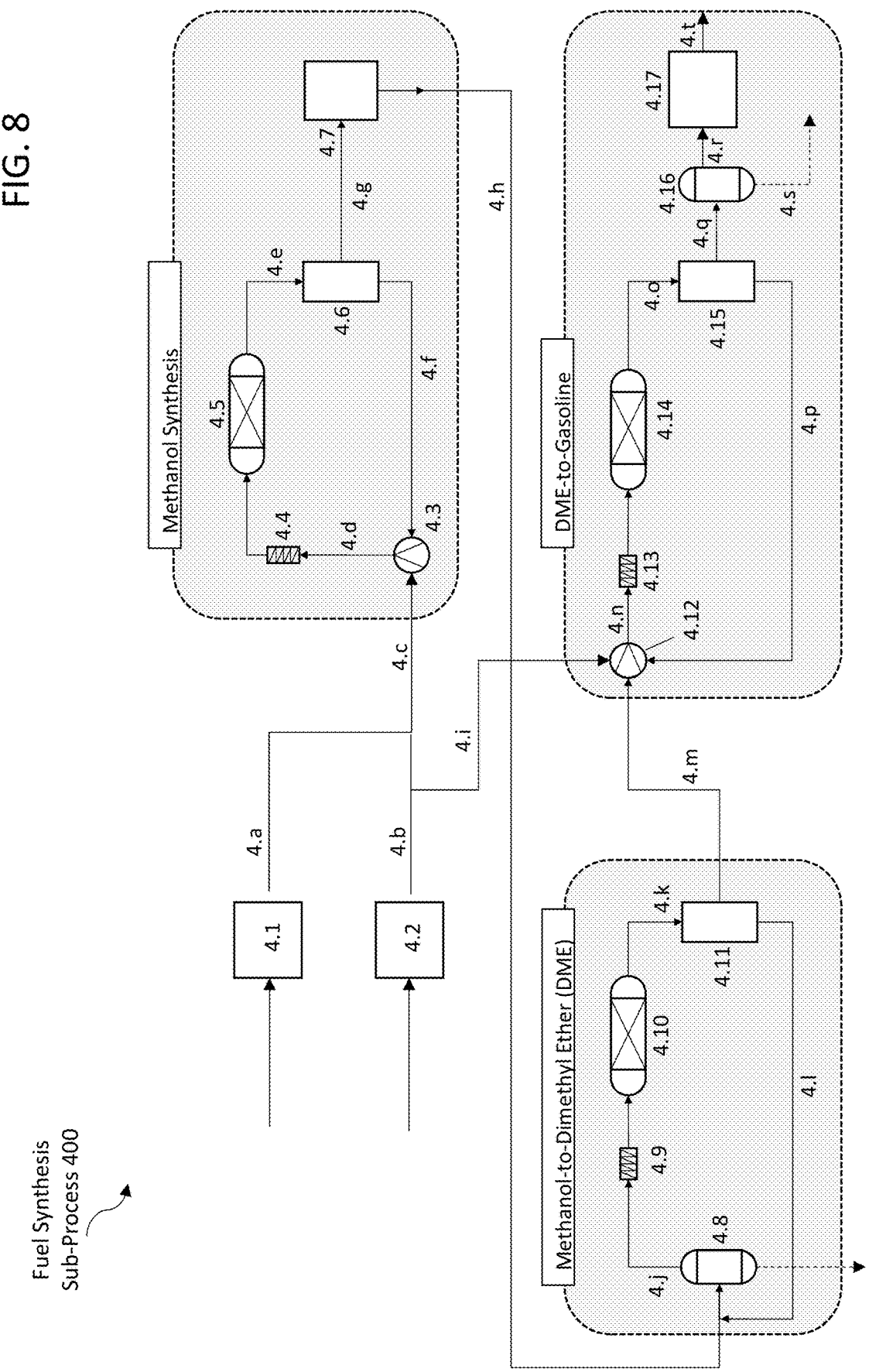
FIG. 8 is a block diagram illustrating an example fuel synthesis sub-process of the fuel production system of FIG. 1, in accordance with an embodiment of the present disclosure.

FIG. 8 is a block diagram illustrating an example fuel synthesis sub-process 400 of system 1000, in accordance with an embodiment of the present disclosure. As can be seen, the fuel synthesis sub-process 400 may be at least partially methanol-to-gasoline (MTG)-based, in accordance with some embodiments. In accordance with some embodiments, the fuel synthesis sub-process 400 may include a methanol synthesis portion, a methanol-to-dimethyl ether (DME) portion, and a DME-to-gasoline portion, each discussed in turn below.

As can be seen from FIG. 8, the fuel synthesis sub-process 400 may involve a $CO_2$ input reservoir 4.1. In accordance with some embodiments, $CO_2$ input reservoir 4.1 may be configured to be in flow communication with the $CO_2$ output stream from the upstream $CO_2$ regeneration sub-process 200 of system 1000. In some embodiments, $CO_2$ input reservoir 4.1 may include an accumulating vessel with a fixed output flow valve.

$CO_2$ input reservoir 4.1 may be configured to output a flow 4.*a*. In accordance with some embodiments, flow 4.*a* may be (or otherwise may include) $CO_2$, as well as water, residual air, and possibly hydrogen (e.g., if hydrogen is used as a sweep gas in outgassing in the $CO_2$ regeneration sub-process 200).

Also, as can be seen from FIG. 8, the fuel synthesis sub-process 400 may involve a hydrogen input reservoir 4.2. In accordance with some embodiments, hydrogen input reservoir 4.2 may be configured to be in flow communication with the hydrogen output stream from the upstream hydrogen generation sub-process 300 of system 1000. In some embodiments, hydrogen input reservoir 4.2 may include an accumulating vessel with a fixed output flow valve.

Hydrogen input reservoir 4.2 may be configured to output a flow 4.*b*, from which a separate flow 4.*i* may be taken. In accordance with some embodiments, flow 4.*b* and flow 4.*i* each may be (or otherwise may include) hydrogen, as well as water. In some cases, the $CO_2$ and water may be mixed and some partial reduction may have affected some carbonate that made it to the anode and produced formate, methanol, and/or formaldehyde.

In accordance with some embodiments, flow 4.*a* and flow 4.*b* may be combined as a flow 4.*c*. Thus, flow 4.*c* may be (or otherwise may include) $CO_2$ and hydrogen, as well as water. In some cases, the $CO_2$, hydrogen, and water may never have been separate.

As previously noted, the fuel synthesis sub-process 400 may include a methanol synthesis portion. As can be seen from FIG. 8, the methanol synthesis portion may involve a mixing component 4.3. In accordance with some embodiments, mixing component 4.3 may be configured to mix flow 4.*c* with flow 4.*f* (discussed below). In some embodiments, mixing component 4.3 may include a Venturi-type valve. In some such cases, mixing component 4.3 may be configured to utilize flow 4.*c* as a motive gas to raise the pressure of flow 4.*f* while also mixing flow 4.*c* and flow 4.*f*.

In accordance with some embodiments, mixing component 4.3 may include a compressor. In some such cases, the compressor may be configured to elevate the pressure of flow 4.*f* to that of flow 4.*c*. In at least some cases, this may facilitate mixing of flows 4.*c* and 4.*f*.

Mixing component 4.3 may be configured to output a flow 4.*d*. In accordance with some embodiments, flow 4.*d* may be (or otherwise may include) $CO_2$, hydrogen, and possibly water and methanol not fully condensed out. In accordance with some embodiments, methanol and/or DME from one or more other portions of the fuel synthesis sub-process 400 (as discussed below) may be returned here to flow 4.*d*

As can be seen further from FIG. 8, the methanol synthesis portion may involve a heater 4.4. In accordance with some embodiments, heater 4.4 may be configured to raise the temperature of flow 4.*d*. To that end, heater 4.4 may be configured, in accordance with some embodiments, as an electric heating element in thermal contact with flow 4.*d*. In accordance with some embodiments, the power delivered to heater 4.4 may be controlled, at least in part, by the temperature of flow 4.*e* (discussed below) output by methanol reactor 4.5 (discussed below). In some cases, heater 4.4 may be used to heat flow 4.*d* such that the pressure thereof is about equal to the operating pressure of downstream methanol reactor 4.5.

Also, as can be seen from FIG. 8, the methanol synthesis portion may involve a methanol reactor 4.5. In some embodiments, methanol reactor 4.5 may be of a fixed bed configuration. In some embodiments, methanol reactor 4.5 may be of generally cylindrical geometry. The dimensions of methanol reactor 4.5 may be customized, as desired for a given target application or end-use. In some embodiments, the aspect ratio of methanol reactor 4.5, for example, may be in the range of about 1:1 to 1:100 (e.g., about 1:1 to 1:10; about 1:10 to 1:50; about 1:50 to 1:100, or any other sub-range in the range of about 1:1 to 1:100). As will be appreciated in light of this disclosure, it may be desirable, at least in some instances, to provide a methanol reactor 4.5 which is of relatively small vessel size. A smaller process vessel may shed generated heat through its sides more easily and, therefore, may be easier to operate isothermally. Also, a smaller process vessel may benefit from having a smaller overall thermal inertia, going from a cold start to full operating conditions faster without additional energy penalty.

In some embodiments, methanol reactor 4.5 may include a copper/zinc oxide (Cu/ZnO) catalyst. In accordance with some embodiments, a pressurized mixture of $CO_2$ and hydrogen (e.g., flow 4.*d*) may be flowed over the Cu/ZnO catalyst to produce a mixture of methanol and water. In accordance with some embodiments, methanol reactor 4.5 may be configured to be operated at a temperature in the range of about 100-300° C. (e.g., about 100-200° C., about 200-300° C., or any other sub-range in the range of about 100-300° C.). As will be appreciated in light of this disclosure, it may be desirable, at least in some instances, to operate methanol reactor 4.5 substantially isothermally to facilitate close to identical process conditions throughout methanol reactor 4.5.

In some embodiments, methanol reactor 4.5 may be at least partially wrapped with an insulating material. In some such cases, the insulating material may serve, at least in part, to equilibrate heat lost through the sides of methanol reactor 4.5 to heat generated inside at a given process temperature, which may depend, at least in part, on the catalyst utilized and the available pressure.

In accordance with some embodiments, methanol reactor 4.5 may be configured to be in thermal communication with an external heat exchanger. In some such cases, heat from the exothermic synthesis reaction within methanol reactor 4.5 may be delivered to the heat exchanger, for example, for use elsewhere in system 1000 (e.g., such as at the input of system 1000).

Methanol reactor 4.5 may be configured to output a flow 4.*e*. In accordance with some embodiments, flow 4.*e* may be (or otherwise may include) methanol ($CH_3OH$), as well as any unreacted $CO_2$ and hydrogen exiting methanol reactor 4.5.

As can be seen further from FIG. 8, the methanol synthesis portion may involve a separator 4.6. In accordance with some embodiments, separator 4.6 may be configured to cool flow 4.*e* to condense out the methanol and water produced. To that end, separator 4.6 may be configured, in accordance with some embodiments, as a condenser or heat exchanger. In some cases, ambient air may be used as a heatsink, being actively blown over an external surface area in physical contact with the cooling gas(es) and/or passively in contact with the same. In some cases, the condensed liquid(s) may be separated via separator 4.6 at elevated pressure, while the unreacted $CO_2$ and hydrogen may be recycled (e.g., via flow 4.*f*, discussed below) to be reintroduced into methanol reactor 4.5.

In accordance with some embodiments, heat extracted from the cooling gas(es) by separator 4.6 may be transmitted to flow 4.*d*, for example, to reduce the load on heater 4.4. In accordance with some embodiments, heat may be extracted and delivered to an interim medium before use elsewhere in the overall process or delivered directly to some process stream elsewhere in the overall process or to the surrounding environment.

Separator 4.6 may be configured to output a flow 4.*f* and a flow 4.*g*. In accordance with some embodiments, flow 4.*f* may be (or otherwise may include) unreacted $CO_2$ and hydrogen, as well as water (e.g., steam). Flow 4.*f* may be recycled one or more times within the methanol synthesis portion in the operation thereof. In accordance with some embodiments, flow 4.*g* may be (or otherwise may include) a mixture of methanol and water.

As can be seen further from FIG. 8, the methanol synthesis portion may involve a holding tank 4.7. In accordance with some embodiments, holding tank 4.7 may be configured to store the mixture of methanol and water received via flow 4.*g*.

Holding tank 4.7 may be configured to output a flow 4.*h*. In accordance with some embodiments, flow 4.*h* may be of substantially the same chemical composition as flow 4.*g* (e.g., water and methanol).

Also, as previously noted, the fuel synthesis sub-process 400 may include a methanol-to-dimethyl ether (DME) portion. As can be seen from FIG. 8, the methanol-to-DME portion may involve a distillation column 4.8. In accordance with some embodiments, distillation column 4.8 may be configured to separate the methanol and water received via flow 4.*h*. More specifically, a concentrated methanol stream (e.g., flow 4.*j*, discussed below) may leave the top of distillation column 4.8, whereas a water stream may leave the bottom of distillation column 4.8, in accordance with some embodiments. Additionally, or alternatively, separating of the liquid mixture of methanol and water may be provided, for example, by a membrane-based approach.

In accordance with some embodiments, distillation column 4.8 may be operated at an elevated pressure. For example, distillation column 4.8 may be operated at a pressure in the range of about 0.01-12 bar gauge (e.g., about 0.01-3 bar gauge, about 3-6 bar gauge, about 6-9 bar gauge, about 9-12 bar gauge, or any other sub-range in the range of about 0.01-12 bar gauge). In accordance with some embodiments, the concentrated methanol stream (e.g., flow 4.*j*, discussed below) may be exposed to additional drying before leaving distillation column 4.8. To that end, drying may be provided, in accordance with some embodiments, by membrane-based process(es) and/or exposing the methanol stream to hygroscopic material(s) that adsorb or absorb water and which may be regenerated from time to time.

Distillation column 4.8 may be configured to output a flow 4.*j*. In accordance with some embodiments, flow 4.*j* may be (or otherwise may include) a mixture of methanol and water having a water concentration in the range of about 0-20% (e.g., about 0-5%, about 5-10%, about 10-15%, about 15-20%, or any other sub-range in the range of about 0-20%). In some cases, flow 4.*j* may have a water concentration in the range of about 2% or less.

In accordance with some embodiments, the methanol and trace water present in flow 4.*j* may be extracted and condensed. In at least some cases, this may allow for utilization of a pump and evaporator, for example, to raise the pressure of flow 4.*j*.

Also, as can be seen from FIG. 8, the methanol-to-DME portion may involve a heater 4.9. In accordance with some embodiments, heater 4.9 may be configured to raise the temperature of flow 4.*j*. To that end, heater 4.9 may be configured, in accordance with some embodiments, as an electric heating element in thermal contact with flow 4.*j*. In accordance with some embodiments, the power delivered to heater 4.9 may be controlled, at least in part, by the temperature of flow 4.*k* (discussed below) output by DME reactor 4.10 (discussed below). In some cases, heater 4.9 may be used to heat flow 4.*j* such that the pressure thereof is about equal to the operating pressure of downstream DME reactor 4.10.

As can be seen further from FIG. 8, the methanol-to-DME portion may involve a DME reactor 4.10. In some embodiments, DME reactor 4.10 may be of a fixed bed configuration. In some embodiments, DME reactor 4.10 may be of generally cylindrical geometry. As will be appreciated in light of this disclosure, it may be desirable, at least in some instances, to provide a DME reactor 4.10 which is of relatively small vessel size. A smaller process vessel may shed generated heat through its sides more easily and, therefore, may be easier to operate isothermally. Also, a smaller process vessel may benefit from having a smaller overall thermal inertia, going from a cold start to full operating conditions faster without additional energy penalty.

In some embodiments, DME reactor 4.10 may include a gamma-alumina ($\gamma$-$Al_2O_3$) catalyst. In accordance with some embodiments, a pressurized mixture of concentrated methanol (e.g., flow 4.*j*) may be flowed over the $\gamma$-$Al_2O_3$ catalyst to produce DME. In accordance with some embodiments, the operating pressure of DME reactor 4.10 may be, for example, in the range of about 3-60 bar (e.g., about 3-15 bar, about 15-30 bar, about 30-45 bar, about 45-60 bar, or any other sub-range in the range of about 3-60 bar). In some cases, the operating pressure of DME reactor 4.10 may in the range of about 10-15 bar (e.g., about 10-12.5 bar, about 12.5-15 bar, or any other sub-range in the range of about 10-15 bar). In accordance with some embodiments, DME reactor 4.10 may be configured to be operated at a temperature in the range of about 100-300° C. (e.g., about 100-200° C., about 200-300° C., or any other sub-range in the range of about 100-300° C.). As will be appreciated in light of this disclosure, it may be desirable, at least in some instances, to operate DME reactor 4.10 substantially isothermally to facilitate close to identical process conditions throughout DME reactor 4.10.

In some embodiments, DME reactor 4.10 may be at least partially wrapped with an insulating material. In some such cases, the insulating material may serve, at least in part, to equilibrate heat lost through the sides of DME reactor 4.10 to heat generated inside at a given process temperature, which may depend, at least in part, on the catalyst utilized and the available pressure.

In accordance with some embodiments, DME reactor 4.10 may be configured to be in thermal communication with an external heat exchanger. In some such cases, heat from the exothermic synthesis reaction within DME reactor 4.10 may be delivered to the heat exchanger, for example, for use elsewhere in system 1000.

DME reactor 4.10 may be configured to output a flow 4.*k*. In accordance with some embodiments, flow 4.*k* may be (or otherwise may include) DME, as well as unreacted methanol exiting DME reactor 4.10.

As can be seen further from FIG. 8, the methanol-to-DME portion may involve a separator 4.11. In accordance with some embodiments, separator 4.11 may be configured to cool flow 4.*k* to condense out unreacted methanol and produced water from the DME. To that end, separator 4.11 may be configured, in accordance with some embodiments, as a condenser or heat exchanger. In some cases, ambient air may be used as a heatsink, being actively blown over an external surface area in physical contact with the cooling gas(es) and/or passively in contact with the same. In some cases, the produced DME may remain in the gaseous phase, while unreacted methanol and produced water may be recycled (e.g., via flow 4.1, discussed below) to distillation column 4.8.

In accordance with some embodiments, heat extracted from the cooling gas(es) by separator 4.11 may be transmitted to flow 4.*j*, for example, to reduce the load on heater 4.9. In accordance with some embodiments, heat may be extracted and delivered to an interim medium before use elsewhere in the overall process or delivered directly to some process stream elsewhere in the overall process.

Separator 4.11 may be configured to output a flow 4.*l* and a 4.*m*. In accordance with some embodiments, flow 4.*l* may be (or otherwise may include) unreacted methanol and water produced via DME reactor 4.10. In accordance with some embodiments, flow 4.*m* may be (or otherwise may include) DME gas, as well as methanol, water, and possibly formaldehyde or other organic molecule(s) from a side chain reaction.

Furthermore, as previously noted, the fuel synthesis sub-process 400 may include a DME-to-gasoline portion. As can be seen from FIG. 8, the DME-to-gasoline portion may involve a mixing component 4.12. In accordance with some embodiments, mixing component 4.12 may be configured to mix flow 4.*m* with flow 4.*p* (discussed below) and flow 4.*i* (discussed above). In some embodiments, mixing component 4.12 may include a Venturi-type valve. In some such cases, mixing component 4.12 may be configured to utilize flow 4.*m* as a motive gas to raise the pressure of flow 4.*p* while also mixing flow 4.*p* and flow 4.*m*. In mixing flow 4.*i* at mixing element 4.12, additional hydrogen may be introduced into the mixed flows so as to increase the H:C ratio in the DME-to-gasoline portion, in accordance with some embodiments. In some such cases, flow 4.*i* may be delivered at an elevated pressure and, thus, may be utilized as a motive gas to raise the pressure of the combined flows 4.*m* and 4.*p*, in accordance with some embodiments.

In some embodiments, mixing component 4.3 may include a compressor. In some such cases, the compressor may be configured to elevate the pressure of flow 4.*p* to that of flow 4.*m*. In at least some cases, this may facilitate mixing of flows 4.*p* and 4.*m*.

Mixing component 4.12 may be configured to output a flow 4.*n*. In accordance with some embodiments, flow 4.*n* may be (or otherwise may include) DME, added hydrogen, and one or more recycle gas(es) from gasoline reactor 4.14 (discussed below), including various forms of carbon-based gases in the range of $C_1$-$C_5$ (e.g., methane, ethane, propane, butane, and pentane) and possibly under-saturated species thereof (e.g., ethene, etc.).

Also, as can be seen from FIG. 8, the DME-to-gasoline portion may involve a heater 4.13. In accordance with some embodiments, heater 4.13 may be configured to raise the temperature of flow 4.*n*. To that end, heater 4.13 may be configured, in accordance with some embodiments, as an electric heating element in thermal contact with flow 4.*n*. In accordance with some embodiments, the power delivered to heater 4.13 may be controlled, at least in part, by the temperature of flow 4.*o* (discussed below) output by gasoline reactor 4.14 (discussed below). In some cases, heater 4.13 may be used to heat flow 4.*n* such that the pressure thereof is about equal to the operating pressure of downstream gasoline reactor 4.14.

As can be seen further from FIG. 8, the DME-to-gasoline portion may involve a gasoline reactor 4.14. In some embodiments, gasoline reactor 4.14 may be of a fixed bed configuration. In some embodiments, gasoline reactor 4.14 may be of generally cylindrical geometry. As will be appreciated in light of this disclosure, it may be desirable, at least in some instances, to provide a gasoline reactor 4.14 which is of relatively small vessel size. A smaller process vessel may shed generated heat through its sides more easily and, therefore, may be easier to operate isothermally. Also, a smaller process vessel may benefit from having a smaller overall thermal inertia, going from a cold start to full operating conditions faster without additional energy penalty.

In some embodiments, gasoline reactor 4.14 may include a zeolite catalyst, such as ZSM-5 and/or CMG-1. In accordance with some embodiments, a pressurized mixture of DME (e.g., flow 4.$n$) may be flowed over the zeolite catalyst(s) to produce a mixture of one or more hydrocarbon(s) and water. In accordance with some embodiments, gasoline reactor 4.14 may be configured to be operated at a temperature in the range of about 100-500° C. (e.g., about 100-300° C., about 300-500° C., or any other sub-range in the range of about 100-500° C.). As will be appreciated in light of this disclosure, it may be desirable, at least in some instances, to operate gasoline reactor 4.14 substantially isothermally to facilitate close to identical process conditions throughout gasoline reactor 4.14.

In some embodiments, gasoline reactor 4.14 may be at least partially wrapped with an insulating material. In some such cases, the insulating material may serve, at least in part, to equilibrate heat lost through the sides of gasoline reactor 4.14 to heat generated inside at a given process temperature, which may depend, at least in part, on the catalyst utilized and the available pressure.

In accordance with some embodiments, gasoline reactor 4.14 may be configured to be in thermal communication with an external heat exchanger. In some such cases, heat from the exothermic synthesis reaction within gasoline reactor 4.14 may be delivered to the heat exchanger, for example, for use elsewhere in system 1000.

Gasoline reactor 4.14 may be configured to output a flow 4.$o$. In accordance with some embodiments, flow 4.$o$ may be (or otherwise may include) a mixture of (1) several different hydrocarbon species, including species within the target range of gasoline, (2) unreacted or under-reacted gases ($C_1$-$C_4$ species), and (3) produced water.

Also, as can be seen further from FIG. 8, the DME-to-gasoline portion may involve a separator 4.15. In accordance with some embodiments, separator 4.15 may be configured to cool flow 4.$o$ to condense out the hydrocarbon(s) and water produced. To that end, separator 4.15 may be configured, in accordance with some embodiments, as a condenser or heat exchanger.

As will be appreciated in light of this disclosure, the unreacted and under-reacted gas(es) of flow 4.$o$ may have a boiling point lower than water and the hydrocarbon(s) within the target product range. Thus, by actively controlling heat extraction in separator 4.15, the target product(s) and the produced water may be condensed out, while the remainder may be recycled to gasoline reactor 4.14, in accordance with some embodiments. In at least some cases, the rate of heat extraction may be controlled, at least in part, by the local ambient temperature. As noted above, it may be desirable to adjust the vapor pressure of the output gasoline according to the local/seasonal temperature. As will be further appreciated, because separator 4.15 may be under elevated pressure, condensing at a lower temperature may condense out more of the lower-boiling point species within the target range. Hence, such a mixture may have a higher vapor pressure compared to a product mixture, for example, that is initially condensed at a higher temperature.

In accordance with some embodiments, heat extracted from the cooling gas(es) by separator 4.15 may be transmitted to flow 4.$n$, for example, to reduce the load on heater 4.13. In accordance with some embodiments, heat may be extracted and delivered to an interim medium before use elsewhere in the overall process or delivered directly to some process stream elsewhere in the overall process.

Separator 4.15 may be configured to output a flow 4.$p$ and a flow 4.$q$. In accordance with some embodiments, flow 4.$p$ may be (or otherwise may include) unreacted $CO_2$ and hydrogen, as well as water. In accordance with some embodiments, flow 4.$q$ may be (or otherwise may include) water and one or more hydrocarbons. For example, for gasoline, the hydrocarbons may be in the range of $C_5$-$C_{12}$. For kerosene and jet fuels, the hydrocarbons may be in the range of $C_{10}$-$C_{16}$. For diesel, the hydrocarbons may be in the range of $C_{12}$-$C_{20}$. The hydrocarbons may be aliphatic or aromatic with varying amounts of hydrogen saturation.

As can be seen further from FIG. 8, the DME-to-gasoline portion may involve a settling tank 4.16. In accordance with some embodiments, settling tank 4.16 may be configured to store flow 4.$q$ temporarily. As will be appreciated in light of this disclosure, because water and hydrocarbons are immiscible and water has a higher density, the water may settle at the bottom of settling tank 4.16. Consequently, the hydrocarbons may be extracted from the top layer, and water may be extracted from the bottom layer, in accordance with some embodiments. In accordance with some embodiments, a centrifuge may be used instead of (or in addition to) settling tank 4.16.

Settling tank 4.16 may be configured to output a flow 4.$r$ and a flow 4.$s$. In accordance with some embodiments, flow 4.$r$ may be (or otherwise may include) one or more hydrocarbons and trace amounts of water. For gasoline, the hydrocarbons may be in the range of $C_5$-$C_{12}$. The hydrocarbons may be aliphatic or aromatic with varying amounts of hydrogen saturation. The small amounts of water in flow 4.$r$ may be cleaned out before flow 4.$s$. In accordance with some embodiments, flow 4.$s$ may be (or otherwise may include) water and trace amounts of one or more of the above-noted hydrocarbons.

Also, as can be seen from FIG. 8, the DME-to-gasoline portion may involve one or more molecular sieves 4.17. In accordance with some embodiments, molecular sieve(s) 4.17 may be configured to selectively separate and store any remaining water dissolved in the product stream. Flow 4.$r$ may be passed through sieve(s) 4.17 at a given flow rate, in accordance with some embodiments.

Molecular sieve(s) 4.17 may be configured to output a flow 4.$t$. In accordance with some embodiments, flow 4.$t$ may be (or otherwise may include) one or more hydrocarbons (from flow 4.$r$), which may serve as liquid fuel product(s). As previously noted, the liquid fuel output of system 1000 (e.g., flow 4.$t$) may be any of a wide range of hydrocarbon-based fuels. For example, in accordance with some embodiments, flow 4.$t$ may be (or otherwise may include) any one (or combination) of gasoline, industrial quality methanol, diesel, kerosene, and jet fuel.

It should be noted, however, that system 1000 additionally (or alternatively) may be configured to produce one or more intermediate products like those discussed in relation to the fuel synthesis sub-process 400, in accordance with some embodiments. More specifically, in accordance with some embodiments, the fuel synthesis sub-process 400 of system 1000 may be configured to produce any one (or combination) of methanol, methane, and DME as the final product. As will be appreciated in light of this disclosure, the operating conditions (e.g., space velocity) of gasoline reactor 4.14 may affect the output product. By including a wider variety of zeolite catalysts in the same gasoline reactor 4.14 (or in subsequent reactor chambers with different zeolite catalysts), a different type of product may be produced under similar processes. Such products may include, for example, kerosene, jet-fuel, and diesel analogs.

It should be further noted that, although system 1000 is primarily discussed herein as including an example MTG-based fuel synthesis sub-process 400, system 1000 is not intended to be so limited. For instance, in accordance with some other embodiments, system 1000 alternatively (or additionally) may include a Fischer-Tropsch-type fuel synthesis sub-process. Such fuel synthesis still may make use of the same starting inputs of $CO_2$ and hydrogen and may yield any one (or combination) of gasoline, paraffinic diesel, and kerosene-type products, in accordance with some embodiments.

Additionally, as will be appreciated in light of this disclosure, it may be desirable to prevent (or otherwise reduce) the possibility of coking (e.g., formation of solid carbonaceous deposits) at the catalytic sites of DME reactor 4.10 and/or gasoline reactor 4.14. As will be further appreciated, the presence of hydrogen over solid carbon or carbon compounds may reduce coking deposits and instead form a hydrogen/carbon gaseous compound. Also, as discussed herein, system 1000 may have access to hydrogen. Thus, in accordance with some embodiments, hydrogen available to system 1000 may be used to minimize coking in DME reactor 4.10 and/or gasoline reactor 4.14 in one or more ways. For example, in accordance with some embodiments, a partial pressure of hydrogen may be maintained in DME reactor 4.10 and/or gasoline reactor 4.14 during normal operation. In turn, this may impact the product hydrocarbon selectivity towards a higher H:C ratio, which may be desirable from a product perspective, at least in some cases. In accordance with some embodiments, DME reactor 4.10 and/or gasoline reactor 4.14 may be taken off-line and fed mainly hydrogen to remove any coke formed.

Input Electric Power:

As noted above, system 1000 may be configured to utilize one or more sources of input electric power, in accordance with some embodiments. For instance, in some embodiments, system 1000 may be configured to utilize electricity from any one (or combination) of a power grid, hydropower, solar power, and wind power to name a few options. In accordance with some embodiments, system 1000 may be configured to receive input electric power from one or more renewable sources. For instance, in some embodiments, system 1000 may be configured to be coupled with (or otherwise have integrated therein) solar panel(s) and/or wind turbine(s). As will be appreciated, in at least some cases, such renewable sources may dispatch DC and/or AC power intermittently (e.g., in a diurnal manner). In some cases, the input electric power supplied to system 1000 (e.g., from an electrical grid) optionally may have been purchased using renewable energy certificates, thus, in effect, ensuring low-to-no-carbon power for operation of system 1000. As will be appreciated in light of this disclosure, it may be desirable, at least in some instances, to condition the input electric power for system 1000 prior to receipt thereby.

In some embodiments, system 1000 may be configured to utilize electricity from an energy storage or generating element, which optionally may be integrated into system 1000. Some example storage sources may include batteries, flywheels, supercapacitors, and magnetic storage, to name a few options. Some example generating sources may include electrochemical devices, fuel cells, microturbines, and internal combustion engines, to name a few options.

It should be noted, however, that system 1000 is not intended to be limited only to utilizing electricity as input power, as in a more general sense, and in accordance with some embodiments, system 1000 may be configured to take advantage of additional and/or different energy sources. For instance, in some embodiments, system 1000 may be configured to take advantage of one or more chemical sources of energy. For example, as will be appreciated, adding heat to an aqueous solution that includes dissolved inorganic carbon (DIC) may result in a higher equilibrium partial pressure of $CO_2$ over the solution. Also, it may be possible to take advantage of chemical energy sources (e.g., in acids), if available to system 1000. While such heat inputs are not necessary for the operation of system 1000, they may be incorporated readily and, at least in some cases, may lower the overall cost of operation. Other uses of low-grade heat are disclosed herein in managing the water content of the air exposed to the sorbent. In some cases, system 1000 may be configured to extract heat from one or more chemical processes thereof (e.g., for small-scale power generation).

In accordance with some embodiments, chemical energy storage may be integrated into system 1000 by drawing on the final and/or intermediate product stages. For example, system 1000 may be configured to draw on the hydrogen that has been produced (e.g., which may be the least-processed chemical stream in the system). At least in some cases, the largest and most cost-effective energy storage capacity may be associated with the final product of system 1000. Given these considerations, it may be advantageous, at least in some cases, to utilize one or more fuel-flexible generators (e.g., such as internal combustion engines). In some embodiments, system 1000 may incorporate a small, high-temperature fuel cell, such as a solid oxide fuel cell (SOFC) or a molten carbonate fuel cell (MCFC), for example, that may be configured to operate on a given mixture of hydrogen, carbon monoxide (CO), partially oxidized hydrocarbons, and/or pure hydrocarbons.

As will be appreciated in light of this disclosure, the chemical conversion of hydrogen and $CO_2$ to methanol and hydrocarbons may include several exothermic steps. Thus, in some embodiments, system 1000 may be configured to draw energy from available heat in the range of about 100-300° C. In some cases, some of this heat may be utilized to operate a small thermal electricity generator (e.g., including Peltier elements and/or Stirling engines).

In accordance with some embodiments, system 1000 may incorporate one or more energy storage systems to bridge energy storage needs at a wide range of storage cycle times. For example, storage means such as flywheels and batteries may be preferable for shorter storage times, whereas storage means such as methanol may be preferable for longer storage times. As will be appreciated in light of this disclosure, at least in some cases, system 1000 may include one or more sub-system(s) (e.g., sensors, computational systems, systems related to operational stability, and safety-related systems) that have a relatively small power draw but need to operate in a substantially continuous manner and, as such, may benefit from one or more means of energy storage.

In accordance with some embodiments, system 1000 may be configured to utilize about 50-200 kWh of electric power per day (e.g., about 50-100 kWh, about 100-150 kWh, about 150-200 kWh, or any other sub-range in the range of about 50-200 kWh). As will be appreciated in light of this disclosure, the electric power consumption of system 1000 may depend, at least in part, on the amount of fuel to be produced per day (e.g., about 1 gal/day, about 2 gal/day, etc.). In accordance with some embodiments, system 1000 may be configured to vary its electric power consumption over a wide range in a given period (e.g., in the course of a day). Some sub-processes may be configured to operate continuously without much input power. Some sub-processes may be configured to be flexibly dispatched and may limit their input power consumption, for example, to times when energy may be most readily available and/or affordable. In some cases, the power demand of system 1000 may be tailored to the availability of low-cost and/or clean-power sources. In an example case, system 1000 may be configured to operate based on electric input power received from one or more associated solar panels during a 4-hour to 6-hour period in the course of a day. System 1000 may be configured to limit its electricity consumption to certain time windows/periods or on demand.

Output Waste Streams:

As will be appreciated in light of this disclosure, a given sub-process of system 1000 may be associated with a material flow that has the potential to generate one or more waste streams. As used herein, "waste stream" generally may refer to any material that is removed from system 1000 without being incorporated into a final or intermediate product (e.g., a fuel output). In accordance with some embodiments, disposal methods for a given waste stream may include, for example: (1) venting/evaporating into the local atmosphere (if safe to do so); (2) combusting (if safe to do so); (3) converting into a component that more readily may be discharged (if safe to do so); (4) draining locally (if safe to do so); and (5) storing locally for intermittent removal (if safe to do so). Some waste streams of system 1000 may be stabilized as solids for removal as needed. Some waste streams may be discharged into a given output of system 1000 (e.g., a $CO_2$-depleted air stream, a discharge water stream, a product stream). As will be appreciated in light of this disclosure, it may be desirable, at least in some instances, to monitor quantities involved and assure that all transfers stay well within safe limits.

In accordance with some embodiments, one or more sub-processes of system 1000 may produce wastewater, as described herein. For example, as discussed herein, in some embodiments the input water may be separated (e.g., via distillation, reverse osmosis, or forward osmosis) into: (1) a product stream including substantially pure water; and (2) a wastewater stream having higher concentrations of compounds present in the input stream. In some cases, wastewater may be either (or both) disposed into local drains or stored on-site for intermittent removal. In some cases, wastewater may be removed, for example, when concentrations compatible with operational specifications of system 1000 are reached, in accordance with some embodiments. As will be appreciated in light of this disclosure, the suitability of a given wastewater removal approach may depend on local water quality and restrictions/regulations.

Also, as discussed herein, the input water and/or produced/recirculated water for system 1000 optionally may undergo one or more pre-treatment and/or continuous treatment processes. In the course of such processes, impurities may be selectively taken out from the water (e.g., using ionic exchange membranes). In accordance with some embodiments, the impurities may be accumulated on site, such as by being adhered to a solid substrate or other suitable material. In turn, the substrate (or other material) hosting the impurities periodically may be regenerated or replaced and disposed of off-site, in accordance with some embodiments.

Furthermore, as discussed herein, system 1000 may output a stream of $CO_2$-depleted air. Apart from being $CO_2$-depleted, this air stream also may contain more (or less) water than the input air, its temperature may have changed, and it may have picked up trace amounts of other materials (e.g., because it has been in contact with liquid sorbent that has been regenerated inside system 1000) or deposited them in this stream. Also, in some cases, $CO_2$ may be released into this air stream by system 1000 from time to time.

As discussed herein, carbon residues may be produced in the operation of system 1000. Carbon residues may be combusted, for example, with the oxygen byproduct of system 1000, in accordance with some embodiments. Also, as will be appreciated in light of this disclosure, one or more waste streams of system 1000 may be substantially water-based and contain dissolved carbon-based compounds in trace amounts. As such, the oxygen byproduct stream may be introduced to such waste stream(s), resulting in the oxidation of the carbon-based compound(s) to produce $CO_2$ that is safe for disposal, in accordance with some embodiments. In accordance with some embodiments, bioremediation additionally (or alternatively) may be implemented. For instance, methanol present in a water stream may be digested by bacteria.

Also, as discussed herein, depending on the configuration of system 1000, the sorbent may have been processed in a salt splitter or in a combination cell that also produced hydrogen and oxygen. In the latter case, the exhaust air may contain traces of hydrogen and have a slightly increased level of oxygen. Other components of note may include ozone and nitrogen-oxygen compounds or reduced versions, like ammonia.

Furthermore, as discussed herein, the operation of system 1000 may result in production of one or more salts. As will be appreciated, some salts (e.g., sodium salts) may generate waste streams which are relatively easily managed for disposal. Some other salts (e.g., calcium salts) may be precipitated out, thereby producing a small stream of solids. It should be noted, however, that such waste streams may be relatively small and, in general, no different from waste streams generated, for example, in the operation of a typical water preparation system. In some cases, one or more impurities may have been obtained from impurity salts present in the make-up water. As will be appreciated, limits on the presence of salts like sodium chloride (NaCl) in the input water for system 1000 may be driven by downstream constraints on gases (e.g., chlorine ($Cl_2$) and chlorine dioxide ($ClO_2$)) that might be discharged to the atmosphere in waste streams. Thus, it may be desirable to control the presence of such impurities in a given waste stream by controlling the composition of the input water (as discussed above), in accordance with some embodiments.

In accordance with some embodiments, a given waste stream optionally may undergo additional processing prior to being let go by system 1000. For example, organic waste streams including residual methanol may be digested through gasification in an alkaline environment, in accordance with some embodiments. To that end, any of a wide range of approaches may be utilized. For instance, in a first example approach, potassium hydroxide (KOH) may be reacted with high-temperature water to decompose organic molecules made from carbon/hydrogen/oxygen-based moieties into potassium carbonate ($K_2CO_3$) and hydrogen, in accordance with some embodiments. As will be appreciated in light of this disclosure, a KOH-based approach may be advantageous, at least in some instances, for water-soluble organic materials and/or organic materials that can be put into fine suspensions.

In a second example approach, steam and carbon/hydrogen/oxygen-based compounds may be exposed to calcium oxide (CaO) or calcium hydroxide ($Ca(OH)_2$) at high temperatures, in accordance with some embodiments. The carbonate reaction of CaO at temperatures at or below about 600° C. may remove $CO_2$ from the gas mixture, thereby driving the equilibrium in the gas phase to essentially hydrogen. As will be appreciated in light of this disclosure, such CaO-based reactions may reduce the carbon content of the residual water, in accordance with some embodiments. As will be further appreciated, a CaO-based process may be advantageous, at least in some instances, for materials that are not water-soluble and cannot be finely dispersed in water.

The KOH-based approach may be implemented in cases of organic substances dissolved in water or carried by water in fine emulsions. In accordance with some embodiments, this water may be heated briefly in a pressure containment to temperatures in excess of 300° C. During heating, the water may be contained and prevented from evaporating. In accordance with some embodiments, one or more heat exchangers may transfer heat from the processed water to the incoming water stream. In this case, potassium hydroxide (KOH) may have been partially converted to potassium carbonate ($K_2CO_3$), and the water may be ready to outgas hydrogen. As will be appreciated, the exit stream may have a lower pH than the input stream.

In accordance with some embodiments, the water supplied to system 1000 may be a mild oxidizer that may be used to convert carbon compounds to carbon monoxide (CO) and carbon dioxide ($CO_2$). As will be appreciated, the higher pH of the water may ensure that $CO_2$ is removed from system 1000 as a carbonate, thereby channeling any carbon compounds into carbonate. In accordance with some embodiments, this may remove organic species like methanol contained in the water from the stream. After or during cooling, this mixture may release hydrogen, in accordance with some embodiments. The carbon and oxygen originally present in the mixture may have been consumed in the production of carbonate. Some of the oxygen may be derived from water and, thus, may leave hydrogen behind. With system 1000, one may heat (e.g., with microwaves) and minimize the time the liquid is held at high temperatures and pressures, in accordance with some embodiments. If input electric power is in short supply, then methanol may be combusted to produce heat, in accordance with some embodiments. A variation of such a system 1000 may use steam and organic materials to produce hydrogen and CO and $CO_2$, where the $CO_2$ may be removed from system 1000 by reaction with solid $Ca(OH)_2$, which also may provide the source of all or some of the steam utilized, in accordance with some embodiments. As an alternative, CaO may be utilized to getter the $CO_2$ from the conversion process, in accordance with some embodiments.

In accordance with some embodiments, potassium carbonate ($K_2CO_3$) may reenter the normal material flow of system 1000. $CO_2$ may be released from calcium carbonate ($CaCO_3$) by heating the material to temperatures in the range of about 700-900° C. As will be appreciated in light of this disclosure, it may be desirable, at least in some instances, to postpone this regeneration step until input electric power is readily available. The hydrogen generated in these waste management processes may be used, for example, in the production of methanol or downstream in the production of gasoline or jet fuel, in accordance with some embodiments. If the generated hydrogen is too dilute, one or more catalysts may be utilized to convert the hydrogen to water, in accordance with some embodiments.

As will be appreciated in light of this disclosure, the disclosed methanol-upgrading processes may involve use of some hydrogen. In accordance with some embodiments, a dedicated hydrogen generating system operating with much higher methanol concentrations may be used for on-demand hydrogen production, when input electric power is in short supply. Heat may be provided by various means, including microwaves or radiative heating, for example. On the other hand, heat for producing hydrogen when input electric power is in short supply may be generated by combusting some of the fuel available, in accordance with some embodiments. An additional form of heat integration may be achieved with a CaO-based $CO_2$ removal system. $CaCO_3$ may be stored for times when electricity may be readily available. Calcination in a first step may produce CaO, which in turn may be reacted with steam at a later time to produce $Ca(OH)_2$. This may release heat at temperatures as high as 500° C. and, therefore, may be used as a heat source in the production of on-demand hydrogen, in accordance with some embodiments. As will be appreciated, reacting CaO as it cools with steam to form $Ca(OH)_2$ may reduce the risk of sintering. The $CO_2$ produced in these cleanup steps may enter the normal process stream, in accordance with some embodiments.

The above-discussed approaches may be used to destroy residual methanol, as well as remove organic compounds formed accidentally in the gasoline, diesel, DME, or jet fuel production steps and which are to be removed from the product stream. In some instances, the low concentration of residual methanol may result in excessive water processing for such a system 1000. At very low concentrations, it may be possible, however, to release the methanol safely to the atmosphere. Although, if other compounds are to be removed from gasoline and use processes that rely on steam and water, then water with small amounts of methanol may be used at these steps. This may help to assure the safe decomposition of the methanol concurrent with the destruction of other organic compounds. In accordance with some embodiments, bioremediation additionally (or alternatively) may be implemented. For instance, methanol present in a water stream may be digested by bacteria.

System Control:

In accordance with some embodiments, one or more algorithms may be utilized in controlling the operation of a given portion of system 1000 and, more generally, system 1000 overall. More specifically, system 1000 may be controlled, in part or in whole, via one or more algorithms, which may be encoded as software, in accordance with some embodiments. In accordance with some embodiments, these algorithm(s) may take as inputs various information described herein, as well as internal process information. In accordance with some embodiments, heuristics from internal sub-process(es) may be incorporated into one or more overall operating algorithm(s).

In accordance with some embodiments, the employed algorithm(s) may be designed to optimize (or otherwise improve) the instantaneous operation of a given sub-process of system 1000, as well as the overall system 1000 as a whole. For example, in some cases, system 1000 may be governed by algorithm(s) that regulate the electric power draw thereof based on one or more of: (1) the current availability of electric power; (2) the input cost; (3) the $CO_2$ footprint of system 1000; (4) the efficiency of the system operation that will vary with the electric power level; (5) the impact of the power draw on maintenance and depreciation of system 1000; and (6) the difference between the desired and actual inventory state of system 1000. In accordance with some embodiments, system 1000 may implement algorithm(s) to deploy energy storage option(s) optimally (or as otherwise desired). In accordance with some embodiments, system 1000 may be configured to be operated based on user preferences pertaining to the price of electricity and/or the availability of low-to-no carbon electricity, thereby allowing the user to control the carbon footprint of the fuel produced via system 1000.

The foregoing description of example embodiments has been presented for the purposes of illustration and description. It is not intended to be exhaustive or to limit the present disclosure to the precise forms disclosed. Many modifications and variations are possible in light of this disclosure. It is intended that the scope of the present disclosure be limited not by this detailed description. Future-filed applications claiming priority to this application may claim the disclosed subject matter in a different manner and generally may include any set of one or more limitations as variously disclosed or otherwise demonstrated herein.

What is claimed is:

1. A modular fuel production system comprising:
a first module in which carbon dioxide ($CO_2$) is extracted from a gas volume received by the system and delivered as dissolved inorganic carbon to one or more other modules of the system;
a second module in which at least one of hydrogen ($H_2$) and $CO_2$ is generated from at least one of a water volume and an aqueous solution received from at least one of:
one or more other modules of the system; and
outside of the system; and
a third module in which a fuel is produced from synthesis of the extracted $CO_2$ and the generated $H_2$;
wherein the system is configured for substantially autonomous operation while environmental conditions change and electricity availability fluctuates.

2. The system of claim 1, wherein the gas volume comprises at least one of:
ambient air;
exhaust from combustion of carbonaceous materials; and
a biogas.

3. The system of claim 1, wherein:
the extraction of the $CO_2$ in the first module involves liquid aqueous alkaline sorbent gas capture via a gas contactor of generally tubular shape having either:
a substantially square or rectangular cross-section; or
a substantially circular or elliptical cross-section; and
a liquid aqueous alkaline sorbent flows through the gas contactor in a gravity-fed manner.

4. The system of claim 3, wherein the gas contactor comprises a fabric.

5. The system of claim 4, wherein the fabric comprises nylon.

6. The system of claim 1, wherein the generation of the $H_2$ in the second module involves alkaline electrolysis.

7. The system of claim 1, further comprising:
a fourth module in which the water volume received by the system is pre-treated before $H_2$ is generated therefrom.

8. The system of claim 7, wherein the pre-treatment of the water volume in the fourth module involves ion exchange-based pre-treatment.

9. The system of claim 1, wherein the third module involves at least one of:
methanol-to-gasoline (MTG) synthesis; and
Fischer-Tropsch synthesis.

10. The system of claim 1, wherein the system is further configured to receive input power from at least one of a power grid, an energy storage unit, an energy generating unit, and a chemical source of energy.

11. The system of claim 10, wherein the energy generating unit is configured to harness at least one of solar energy and wind energy.

12. The system of claim 1, wherein the fuel comprises a liquid fuel.

13. The system of claim 1, wherein the fuel comprises at least one of methanol, dimethyl ether (DME), gasoline, diesel, ethanol, and jet fuel.

14. The system of claim 1, wherein the system at least one of:
occupies a space of less than or equal to about 5 $m^3$;
occupies a space of less than or equal to about 1 m×1 m×2 m; and
has a mass of less than or equal to about 300 kg.

15. The system of claim 1, wherein in the second module, hydrogen additionally is generated from water produced by the system.

16. The system of claim 1, wherein the gas contactor is configured to change shape during operation thereof.

17. The system of claim 1, further comprising a fourth module in which at least one of water and hydrocarbons are produced from hydrogen, $CO_2$, carbon monoxide (CO), or oxygenated or un-oxygenated hydrocarbons, wherein said materials are recirculated or received from one or more other modules of the system.

18. The system of claim 1, further comprising a fourth module configured to condition and partially store intermittent electric power.

19. The system of claim 1, further comprising a fourth module configured for water preparation and cleanup.

20. The system of claim 1, further comprising a fourth module configured for processing waste streams generated within the system.

21. The system of claim 1, wherein a product stream output by the system is adjustable based on at least one of operating conditions and external demand.

22. The system of claim 1, wherein the system is configured to process enough $CO_2$ to produce up to 3 gallons of fuel per day.

23. A system comprising:
a plurality of the modular fuel production system of claim 1, wherein each of the constituent modular fuel production systems is separately functional.

24. A system comprising:
a plurality of the modular fuel production system of claim 1, wherein a connection between modules does not allow for separation into standalone systems.

* * * * *